United States Patent [19]
Neuner et al.

[11] 3,858,191

[45] Dec. 31, 1974

[54] DIGITAL MULTIPLEXED POSITION INDICATION AND TRANSMISSION SYSTEM

[75] Inventors: James A. Neuner, Gibsonia; Francis T. Thompson, Murrysville; Leonard C. Vercellotti, Verona, all of Pa.

[73] Assignee: Westinghouse Electric Corporation, Pittsburgh, Pa.

[22] Filed: Jan. 3, 1973

[21] Appl. No.: 320,792

[52] U.S. Cl.......... 340/188 R, 340/166 R, 340/179, 340/181, 340/195, 340/212, 176/19 EC, 307/242

[51] Int. Cl........................ G08b 23/00, G08c 19/06

[58] Field of Search..... 340/188 R, 196, 151, 152 R

[56] References Cited

UNITED STATES PATENTS

| | | | |
|---|---|---|---|
| 3,154,946 | 11/1964 | Ordorica | 340/196 |
| 3,253,260 | 5/1966 | Hawley | 340/151 |
| 3,750,122 | 7/1973 | Maeda | 340/196 |

*Primary Examiner*—Thomas B. Habecker

*Attorney, Agent, or Firm*—D. C. Abeles; A. T. Stratton

[57] ABSTRACT

A digital position indication system for displaying the relative position of at least one movable element with respect to fixed known coordinates. A sensory system is provided for each movable element and is responsive to the element's position to provide discrete electrical outputs indicative thereof. The discrete electrical outputs are encoded in the form of a corresponding gray code. Two sensory groups per element are described, constructed in an interleaved array with the signals from each group processed separately in independent signal trains. The signals within the individual trains contain the information required to indicate the element's location within one-half of the overall resolution of the system. Each encoded signal is assigned an address and the information carried by the two trains are separately multiplexed through a system of independent interfaces to a control system which demultiplexes, periodically updates, and stores the information corresponding to each element. The control system combines the information conveyed by each train to provide full resolution of the element's position and organizes the resulting data for presentation on a visual pictorial display. A universal interface provides inputs compatible with most computers for further signal processing and monitoring. Additionally, a fault detection system is built into each train to monitor electrical malfunctions and block affected signals providing an error indication in its place. Thus, a malfunction in one train will not disable the system but will merely reduce the resolution of the position information conveyed.

18 Claims, 33 Drawing Figures

| TABLE A | TABLE B UNDEFINED(UNDEF) | TABLE C | TABLE D | TABLE E | TABLE F | TABLE G |
|---|---|---|---|---|---|---|
| UNDEF | 11010 | UNDEF | UNDEF | UNDEF | UNDEF | UNDEF |
| 11010 | 11011 | 10011 | 10011 | UNDEF | 100110 | 100110 ← ROD TOP |
| 11011 | 11001 | 10010 | 10010 | 100110 | 100100 | 100100 |
| 11001 | 11000 | 10001 | 10001 | 100101 | 100010 | 100010 |
| 11000 | 01000 | 10000 | 10000 | 100100 | 100000 | 100000 |
| 01000 | 01001 | 01111 | 01111 | 100011 | 011110 | 011110 |
| 01001 | 01011 | 01110 | 01110 | 100010 | 011100 | 011100 |
| 01011 | 01010 | 01101 | 01101 | 100001 | 011010 | 011010 |
| 01010 | 01110 | 01100 | 01100 | 100000 | 011000 | 011000 |
| 01110 | 01111 | 01011 | 01011 | 011111 | 010110 | 010110 |
| 01111 | 01101 | 01010 | 01010 | 011110 | 010100 | 010100 |
| 01101 | 01100 | 01001 | 01001 | 011101 | 010010 | 010010 |
| 01100 | 00100 | 01000 | 01000 | 011100 | 010000 | 010000 |
| 00100 | 00101 | 00111 | 00111 | 011011 | 001110 | 001110 |
| 00101 | 00111 | 00110 | 00110 | 011010 | 001100 | 001100 |
| 00111 | 00110 | 00101 | 00101 | 011001 | 001010 | 001010 |
| 00110 | 00010 | 00100 | 00100 | 011000 | 001000 | 001000 |
| 00010 | 00011 | 00011 | 00011 | 010111 | 000110 | 000110 |
| 00011 | 00001 | 00010 | 00010 | 010110 | 000100 | 000100 |
| 00001 | 00000 | 00001 | 00001 | 010101 | 000010 | 000010 |
| 00000 | UNDEF | 00000 | 00000 | 010100 | 000000 | 000000 ← ROD BOTTOM |
| UNDEF | | UNDEF | UNDEF | 010011 | UNDEF | UNDEF |
| | | | | 010010 | | |
| | | | | 010001 | | |
| | | | | 010000 | | |
| | | | | 001111 | | |
| | | | | 001110 | | |
| | | | | 001101 | | |
| | | | | 001100 | | |
| | | | | 001011 | | |
| | | | | 001010 | | |
| | | | | 001001 | | |
| | | | | 001000 | | |
| | | | | 000111 | | |
| | | | | 000110 | | |
| | | | | 000101 | | |
| | | | | 000100 | | |
| | | | | 000011 | | |
| | | | | 000010 | | |
| | | | | 000001 | | |
| | | | | 000000 | | |
| | | | | UNDEF | | |
| | | | | UNDEF | | |
| εσγβα | εσγβα | $2^4 2^3 2^2 2^1 2^0$ | $2^4 2^3 2^2 2^1 2^0$ | $2^5 2^4 2^3 2^2 2^1 2^0$ | $2^5 2^4 2^3 2^2 2^1 2^0$ | $2^5 2^4 2^3 2^2 2^1 2^0$ |

FIG.3C

DIGITAL MULTIPLEXED POSITION INDICATION AND TRANSMISSION SYSTEM

CROSS REFERENCE TO RELATED APPLICATIONS

The present invention is related to the inventions covered by copending U.S. patent applications: (Westinghouse Case No. 43,906) Ser. No. 320,776, entitled "Position Indication System" by F. T. Thompson, Frederick J. Young and D. J. Boomgaard; (Westinghouse Case No. 44,071) Ser. No. 320,774, entitled "An Automatic Programming System for Standardizing Multiplex Transmission Systems" by J. A. Neuner and M. Traversi; (Westinghouse Case No. 44,077) Serial No. 320,773, entitled "Position Indication System" by J. A. Neuner and D. J. Boomgaard; (Westinghouse Case No. 44,070) Serial No. 320,778, entitled "Tracking Level Detector" by J. A. Neuner and M. Traversi; and (Westinghouse Case No. 44,170) Serial No. 320,775, entitled "Majority Vote System for Common Bus Signal Distribution" by J. A. Neuner and M. Traversi. All of the aforementioned U.S. patent applications are assigned to the assignee of the present invention and are filed concurrently herewith.

BACKGROUND OF THE INVENTION

This invention pertains in general to a new digital transmission system for transmitting and recovering a plurality of discrete independent coded signals and more particularly to a new digital position indication system for displaying the relative position of a movable element with respect to fixed known coordinates.

There are a great number of applications requiring the monitoring of a movable member at an extended remote location wherein transmission between the monitoring location and the member is subject to an extreme hostile environment. For example, in the nuclear art, it is necessary to monitor the location of control rods within a reactor core to control the power balance of a nuclear reactor. The use of the term "control rods" is used herein to include any member positioned within the reactor which alters the reactivity of the reactor. Thus, this includes rods which serve other purposes besides normal control use. The use of the word "rod" is synonymous with "control rod" for the purposes of this invention.

The control rods are located within proximity of nuclear fuel elements comprising nuclear fissionable material. Generally, the greater the number of neutrons within the reactive region of the reactor, the greater the number of fissions of the fuel atoms that take place, and consequently, the greater the amount of energy released. Energy, in the form of heat, is removed from the reactive region by a coolant which flows through the region and then flows to a heat exchanger wherein the heat from the reactor coolant is used to generate steam for driving turbines to transfer heat energy into electrical energy. To decrease the energy output of the nuclear reactor, the control rods, made of materials which absorb neutrons, are inserted within the reactive region, commonly known as the nuclear core. The greater the number of control rods and the further the control rods are inserted within the reactive region, the greater the number of neutrons that will be absorbed and, hence, the energy output of the reactor will decrease. Conversely, to increase the energy output of the reactor, the nuclear control rods are withdrawn from the reactive region; consequently, the number of neutrons absorbed decreases, the number of fissions increases, and the energy output of the reactor increases. For pressurized water reactors, it is of the utmost importance to note the accurate position of each of the control rods. Differences of over 15 inches between neighboring rods are considered unsafe. In addition, knowledge of the position of the rods versus thermal power output gives an indication of the condition of the reactor, thus, the degree of fuel burn-up. Therefore, extremely reliable control rod drive and position monitoring systems must be employed in order to maintain the safe and reliable operating status of the reactor.

One system presently employed to lower and raise the control rods utilizes a jack-type electromechanical mechanism which uses a plurality of electrical coils to incrementally insert or withdraw each control rod within the reactor. Such a system is more fully described in U.S. Pat. No. 3,158,766, issued to E. Frisch and assigned to the assignee of the present invention.

The control rods move within a pressure vessel and are attached to drive rods, which can be incrementally moved in a forward or reverse direction by a drive mechanism, such as the magnetic jack mechanism described in the cited Frisch patent. The drive rods extend longitudinally through the pressure vessel along the axis of movement of the control rods, into the sealed, pressurized environment of the rod travel housings. Since it is of the utmost importance to maintain the sealed integrity of the pressurized vessel, mechanical penetrations are kept at a minimum to reduce the likelihood of loss of the pressurized environment contained therein. Accordingly, no mechanical penetrations are permitted for detecting the relative position of the control rods within the core of the reactor. Inasmuch as it would be a very difficult task to detect the position of the actual control rods, it has been the practice to detect the position of the drive rods which are affixedly coupled thereto and translate drive rod position into control rod location within the core of the reactor vessel.

There have been a multiplicity of systems devised for detecting the drive rod position, a few examples of which are illustrated in U.S. application Ser. No. 093,343, entitled "Magnetic Position Indicator" by Dean C. Santis et al., filed Nov. 27, 1970 and assigned to the assignee of the present invention. Each of the indicators described have some dependence on temperature, rod magnetization, permeability of the rod, voltage and frequency of the power supply. Additionally, each of the described systems is susceptible to interference from adjacent control rods and drive mechanisms.

In addition, transmission of the resulting sensory signals through the reactor containment environment to the control room for observation by the reactor plant operator has been an exceedingly difficult task due to the hostile conditions encountered. Reliable sensory position indication is of absolutely no value without an accurate means of transporting that information from the containment environment to the control room maintained within a separate building.

Thus, a new rod position indicator is desired to detect the position of the drive rod within a specified accuracy, while maintaining a high degree of insensitivity to the aforementioned conditions. Furthermore, redundancy is desired to protect against the loss of an entire position indication system due to one malfunction.

SUMMARY OF THE INVENTION

Briefly, this invention discloses a digital position indication system for displaying the relative position of at least one movable element with respect to fixed known coordinates. A sensory system is provided for each movable element monitored and is responsive to the element's position to provide discrete electrical outputs indicative thereof. The discrete electrical outputs are encoded to digital coded form corresponding to the respective position information conveyed. Each coded signal is assigned an address and the signals are multiplexed through a system of interfaces to a control system which demultiplexes, periodically updates, and stores the information corresponding to each element. The control system then organizes this information for presentation on a visual pictorial display. An additional universal interface provides inputs compatible with most computers for further signal processing and monitoring.

In one modified embodiment, two sensory groups are provided per element forming the sensory system described above. The two groups are constructed in an interleaved array and the signals from each group are similarly processed in separate independent signal trains. The signals within the individual trains contain the information required to indicate the element's position within one-half of the overall system's resolution. This information is demultiplexed and combined within the control system to provide full resolution of the element's position.

An additional fault detection system compatible with each train is described to monitor electrical malfunctions and block affected signals providing an error indication in its place. This error signal is described, in modified form, to indicate the exact location of the malfunction within the position indication system. Thus, a malfunction in one train will not disable the system or reduce the credibility of the information conveyed, but will merely reduce the resolution of the position data.

BRIEF DESCRIPTION OF THE DRAWINGS

For a better understanding of the invention, reference may be had to the preferred embodiment, exemplary of the invention, shown in the accompanying drawings, in which:

FIG. 3C is a tabulated presentation of the encoder signals of FIG. 2 and 3A reduced to gray code;

DESCRIPTION OF THE PREFERRED EMBODIMENT

The basic sensor of this invention is a coil positioned around the perimeter of the axis of movement of a movable member such as a control rod drive travel housing in a nuclear reactor application. When an AC current is sent through the coil, an AC flux is created which will penetrate into the housing. If the frequency is sufficiently low, the skin depth will be larger than the thickness of the housing, and the AC flux will penetrate all the way through. The normal power frequency of 60 Hz easily meets this criterion. If, then, a metal rod is moved through the rod travel housing past the location encompassed by the coil, the impedance of the coil will change. If the rod is made of a ferromagnetic material, the impedance of the coil will increase. This change in impedance can be detected in a great many ways to provide information on the rod's position relative to the coil. For example, the current through the coil can be monitored by measuring the voltage across a small resistor in series with the coil while the assembly is powered from a constant voltage generator.

Figure 1:
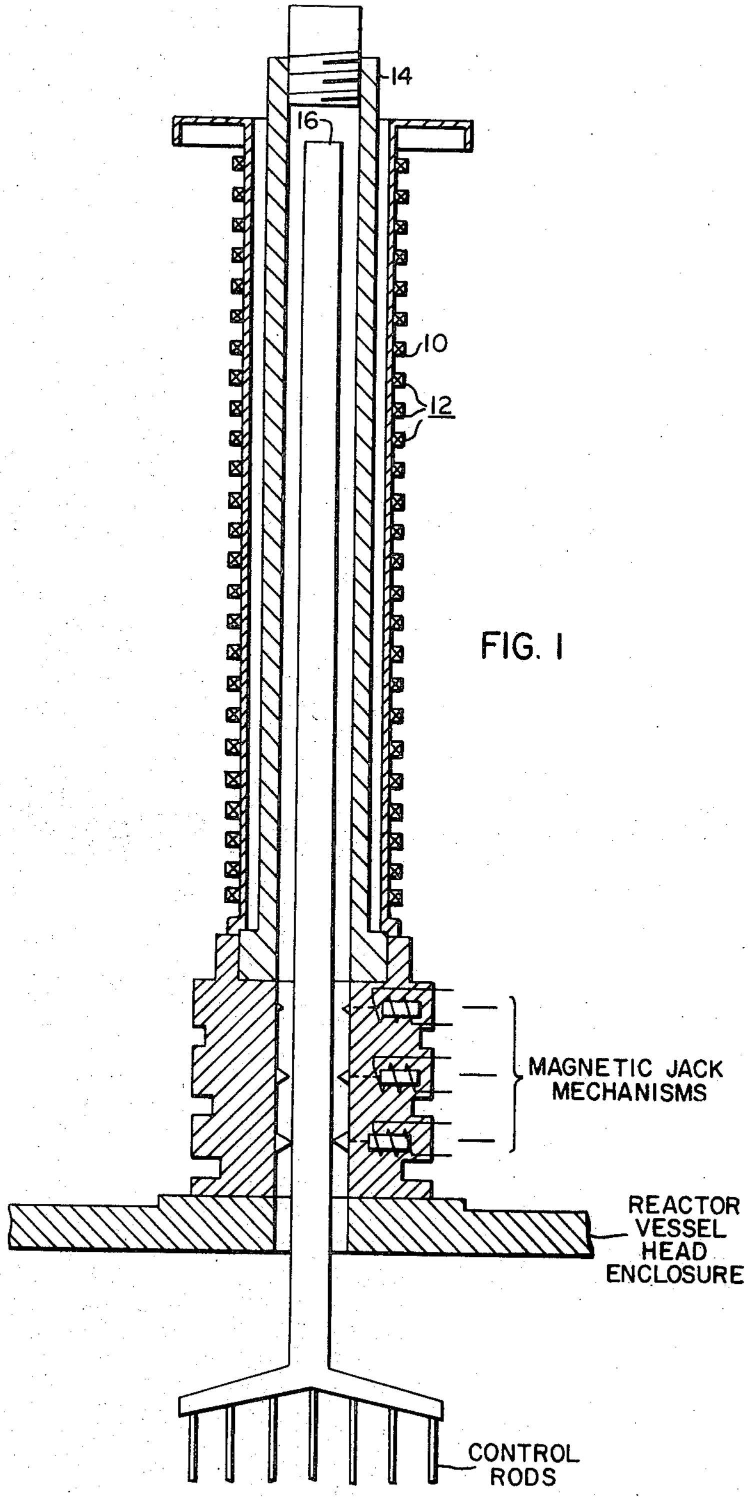
FIG. 1 is a schematic diagram of a reactor control rod with its associative drive rod and rod travel housing incorporating the basic sensor of this invention.

To build a complete rod position indication system, a stack of coils 12 is mounted on the rod travel housing 14 as illustrated in FIG. 1. Each coil is connected to a resistor, and the inputs of a differential amplifier are connected between each pair of adjacent resistors (as described in application Ser. No. 320,776, W.E. 43,906). There will always be one differential output from the amplifiers larger than all the others, indicating exactly between which two coils the end of the rod 16 is positioned.

The coils are spaced relatively close together. Therefore, it is virtually impossible to build up an apprecible gradient in temperature, magnetic field, material constants, etc., between two adjacent coils. Since the whole system operates on the principle of balanced or unbalanced impedances, between two adjacent sensor, it appears that only the rod 16 can cause this condition by being through one sensor and not through the adjacent one. Accordingly, the indication system is insensitive to temperature, adjacent rods, variations in power supply (voltage and frequency), magnetization, and magnetic properties of the rod.

Of course, care has to be taken that the coils themselves have substantially identical characteristics, and the same is true for the terminating resistors. However, this is not a difficult task for those skilled in the manufacture of electrical components. Since the coils do have a certain amount of mutual coupling, the two coils positioned at the end of the stack 12 behave slightly different than the inside coils. Small corrections to the terminating resistors for the two end coils, however, take care of this affect. The basic sensor summarized above is more completely described in copending application Ser. No. 320,776 (Westinghouse Case No. 43,906), cited above.

Figure 3A:
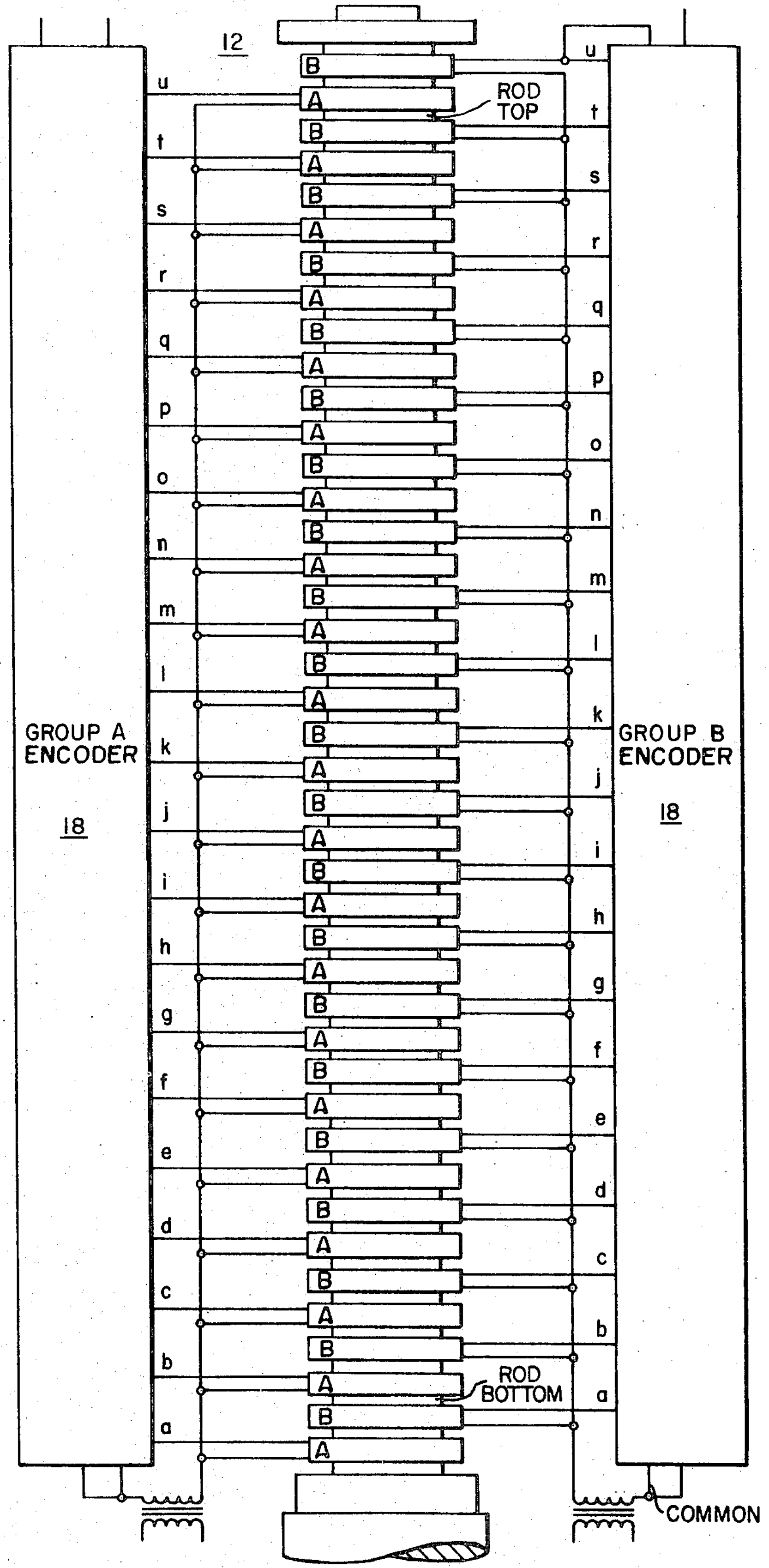
FIG. 3A is a schematic diagram of the detectors of FIG. 1 and the encoder subsystem of FIG. 2 shown in block form.

The modification contemplated by this invention divides the stack of coils 12 into two interleaved groups, A and B, which together for the sensor system as illustrated in FIG. 3A. The signals obtained from each group of coils are processed separately within the reactor containment. The signals within each group contain the information required to locate the position of the rod within one-half of the overall resolution of the system. Therefore, if one group malfunctions, the system's resolution is degraded but the location of the rod is still known.

Figure 2:
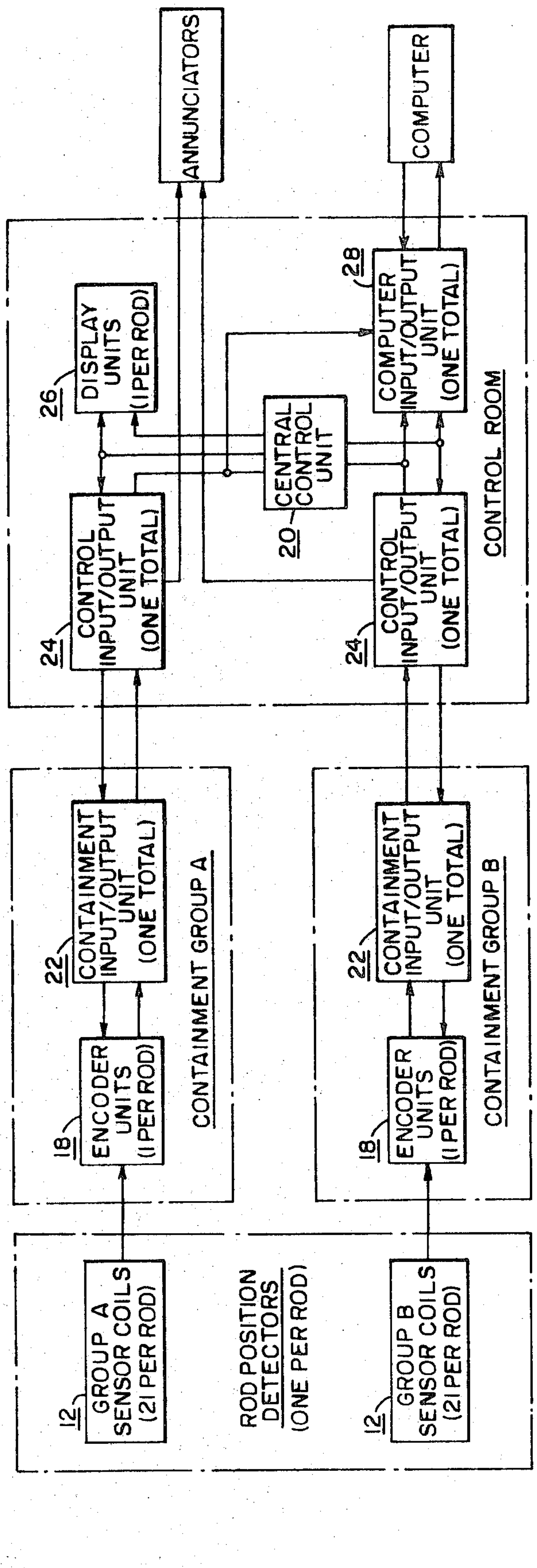
FIG. 2 is a block diagram illustrative of the subsystems of this invention.

Each of the approximately 61 control rods within a four loop plant would have a stack of coils, and a group A encoder and a group B encoder 18 within the reactor containment structure as illustrated in FIG. 2 for encoding the respective coil output signals to a multiplexing arrangement. There are approximately 42 coils provided for each rod, 21 per group, with an encoder 18 associated with each rod per group. A single input/output interface 22 is provided within the containment for the A group and another for the B group. Each interface sequentially addresses each encoder 18 within its own group upon a command address from a central control 20 and accepts a 5-bit digital code from the corresponding encoder containing the rod position data for each rod. In this manner, the data for a group is multiplexed onto a single set of field wires, thereby minimizing containment penetrations and field wiring costs. At the reactor control room, a similar input/output interface 24 is used in conjunction with the control circuitry 20 to demultiplex (distribute) the information for each rod to flip-flop memories which contain the updated position information for each rod. Furthermore the information from the A and B groups are recombined to provide full resolution rod position information. This information is used to control a novel light-emitting diode display 26 to give a visual indication of rod position. The information can also be fed to a digital computer through a novel universal interface 28. An additional advantage of this system is that it provides a digital indication of rod bottom position (the lowest mechanical extreme of rod travel indicated by RB in FIG. 3A), thereby eliminating the need for expensive bistable rod bottom detectors. A mode switch, to be described, incorporated within the system, permits the selection of a half resolution output from either train A or train B, or the full combined resolution.

The blocks indicated by the solid lines in FIG. 2 indicate functions performed by the specific subsystems of this invention. Particular features of this invention associated with each subsystem will be discussed in the operational description presented below.

In all, only six subsystems are required to implement the position indication system of this invention. Since the encoder 18 and the display systems 26 occur on a per-rod basis, they constitute the majority of the system.

Encoder Subsystem

The encoder subsystems 18 are contained within the containment electronics, one in each group for each rod to be monitored. Their primary functions are to detect the position of a corresponding rod with one-half the resolution desired, to encode this position as a 5-bit gray code and to enter the position data, in gray code form, into the multiplexing subsystem upon command. A secondary function of the encoder subsystems 18 is to check for electrical malfunctions within corresponding detector stacks 12, associated cabling, and the majority of the encoder electronics. Failures in these areas will result in a specific error code output in place of the position data.

Figure 3B:
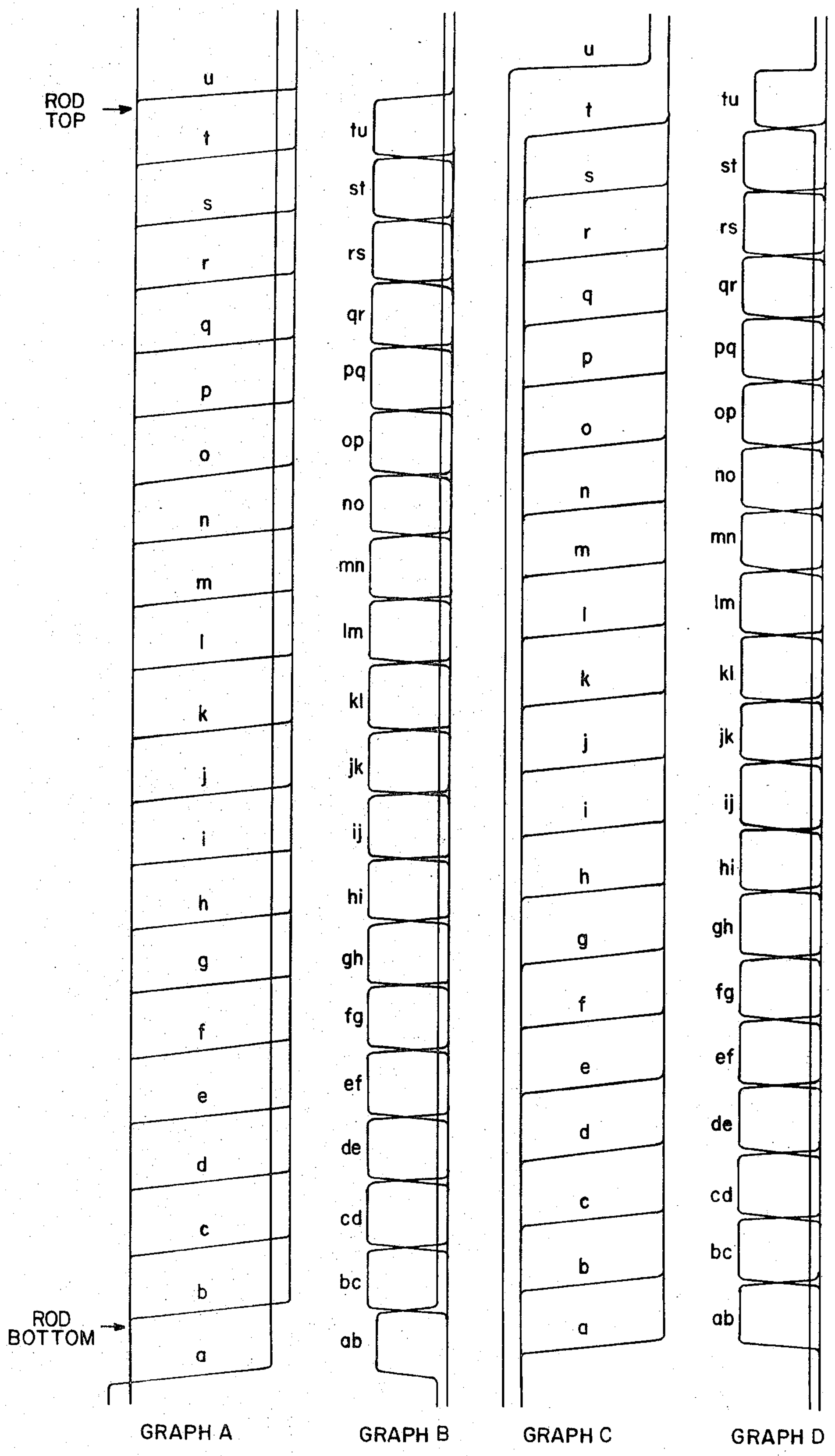
FIG. 3B is a graphical illustration of the encoder signals of FIG. 2 and 3A.

FIGS. 3A, 3B and 3C show the connection of the detector stack 12 to each encoder subsystem 18 and the signals generated both from the encoder and from the central control subsystem 20. Graph A illustrates the encoder inputs obtained from the respective outputs of the group A coils. Graph B illustrates the voltage difference obtained from a comparison of the impedances in adjacent coils of group A. Graphs C and D are the corresponding group B analogy to graphs A and B. The Tables A, B, C, D, E, F and G illustrate the codes generated by the encoder and control system in response to the sensory coil outputs. Table A illustrates the gray code generated from the respective group A encoder units. Table B illustrates the gray code generated from the respective group B encoder units. $\epsilon$, $\sigma$, $\gamma$, $\beta$, and $\alpha$ respectively represent the corresponding gray code bits. Tables C and D respectively illustrate the corresponding group A and group B gray codes converted to binary. Table E illustrates the corresponding control system digital output when groups A and B are functioning properly. Tables F and G respectively illustrate the corresponding control system digital output when a malfunction is detected first in group A, then in group B. The signals illustrated in the aforedescribed graphs are plotted as a function of rod position corresponding to the coil stack shown in FIG. 3A. The graphical illustrations are self-explanatory, however, if further explanation is desired, a corresponding operational description with analogous figures can be found in copending application Ser. No. 320,776 (Westinghouse Case No. 43,906) cited above.

Figure 4A:
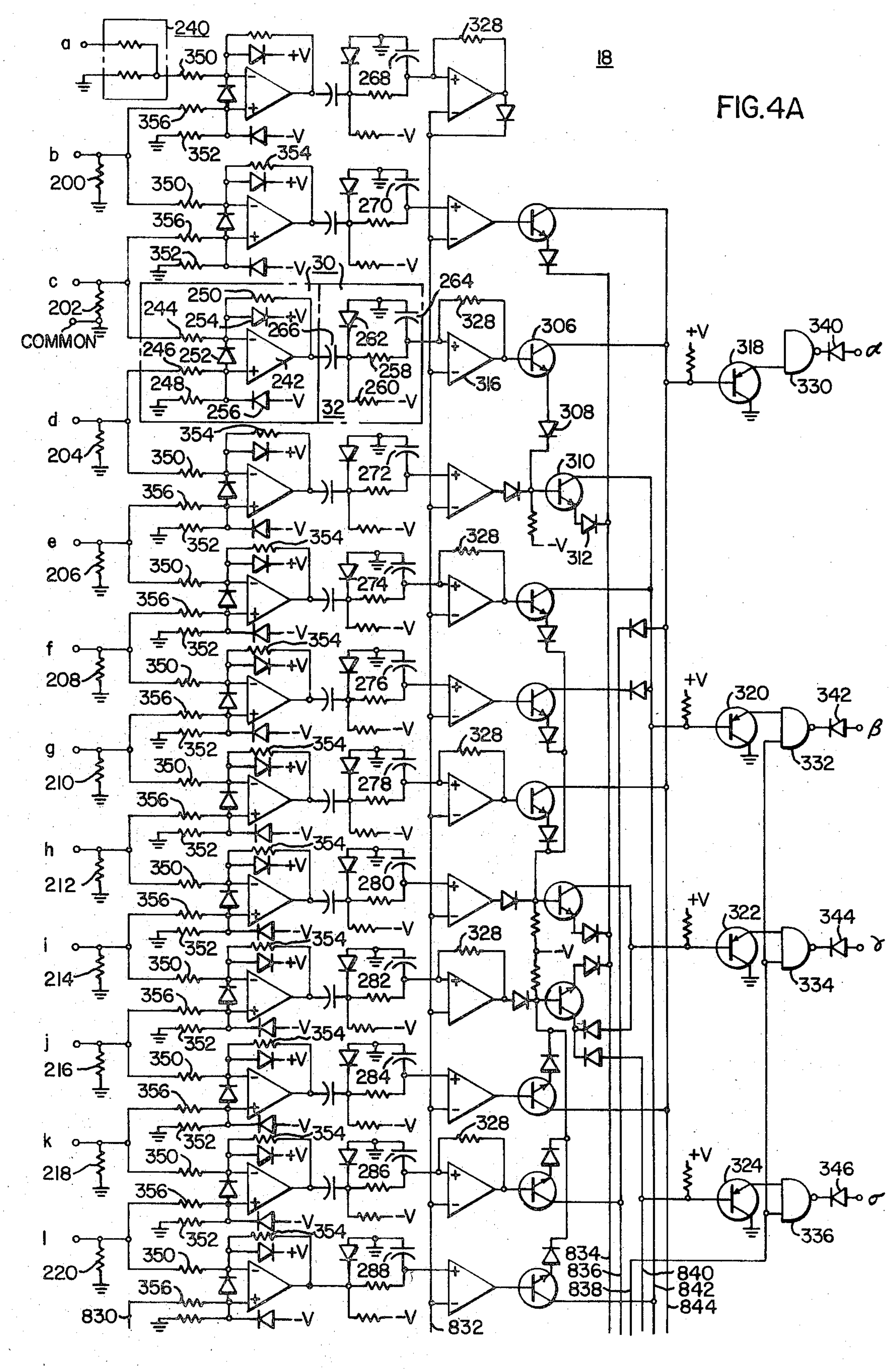
FIGS. 4A and 4B are schematic circuitry diagrams of the encoder system of FIG. 2.
Figures 4B, 4C:
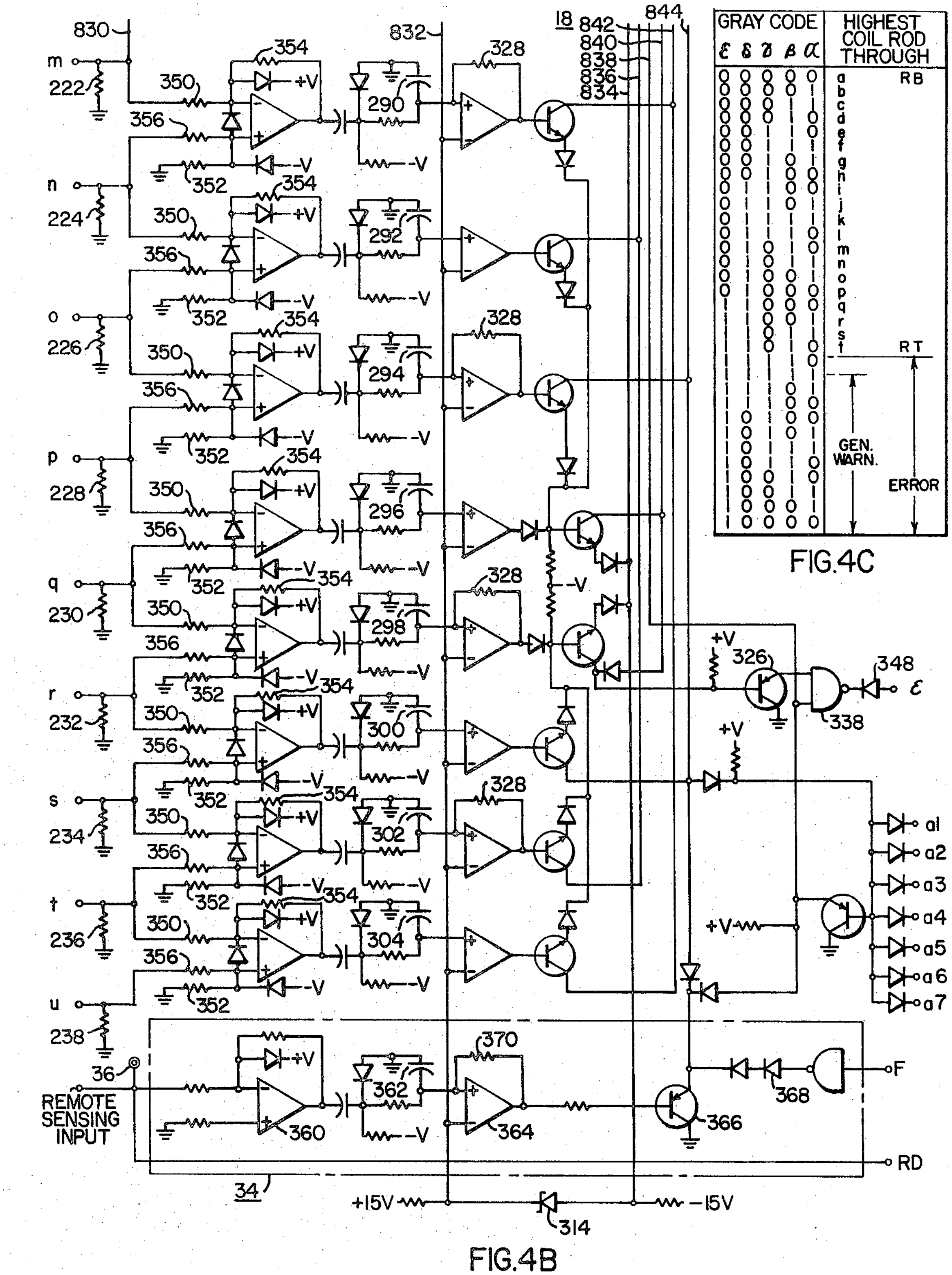
FIG. 4C is a tabulated illustration of the encoder signals processed by the circuitry illustrated in FIGS. 4A and 4B.

FIGS. 4A and 4B show a schematic circuitry diagram of the encoder subsystem 18. The inputs shown on the left of FIGS. 4A and 4B a through u, correspond to the encoder inputs a through *u* illustrated in FIG. 3A. In this exemplary embodiment, each coil, except the end coils, are terminated in 5 ohm resistors 200 through 238. Since the mutual coupling is less for the end coils they are terminated differently for compensation. The encoder electronics in FIG. 4A, exemplifying the A group, identifies this end coil termination by reference character 240. The signals shown in graphs A and C of FIG. 3B represent the RMS voltage change across the corresponding terminating resistors as the rod passes through the respective coils. Each AC voltage is compared to the voltages generated by the two adjacent coils to produce the signals shown in graphs B and D of FIG. 3B. Rod position is determined by the largest difference caused by the rod being through one coil and not through the next. This difference output is then used to generate the corresponding gray codes shown in Tables A and B of FIG. 3B.

The encoder 18 is formed, in part, from a plurality of substantially identical circuits, the operation of which will be described by reference to a typical circuit generally identified by reference character 30 in FIG. 4A. The corresponding input data signal *c* from the detector stack illustrated in FIG. 3A is compared to input data signal *d* by using amplifier 242 in cooperation with resistors 244, 246, 248 and 250 to subtract *c* from *d* and multiply by five. Diodes 252, 254 and 256 are used to clamp any transients at the input terminals within acceptable limits. The resulting signal at the input to the filter 32 is either zero (if the rod is either through both or neither of the coils responsible for signals *c* and *d*) or an AC signal (if the rod is through the coil corresponding to *c* but not through the coil corresponding to signal *d*).

The AC signal is then filtered using a high pass filter, DC restorer, and low pass filter combination composed of components 258, 260, 262, 266 and 264. This seemingly elaborate filtering is provided to protect against an extreme condition of adverse electromagnetic interference. The operation of the remaining circuits associated with the other sensory signal inputs is analogous to that described.

The resulting DC signals present on capacitors 264 and 268 through 304 are then compared by a tracking level detector/encoder circuit shown to the right of the circuit just described. The tracking level detector is the subject of application Ser. No. 320,778 (Westinghouse Case No. 44,070) cited above. Accordingly, a more detailed description can be found within the cited application. In this circuit, the largest positive DC voltage takes control of the circuit and provides a corresponding output indicative of the position of the rod. For example, if the signal on capacitor 264 was the largest, then transistor 306 would be conducting in an effort to make the feedback signal, via components 306, 308, 310, 312 and 314, to the inverting input of operational amplifier 316 equal to the signal on capacitor 264. At this time, the signal on all other like inverting inputs will approximately equal the voltage on capacitor 264 and therefore be greater than the signals at the non-inverting corresponding inputs of the other operational amplifiers within the detector array, causing all other amplifiers to be saturated negative and turning off all NPN transistors except 306 and 310 controlled by the operational amplifier 316. The conduction of transistor 306 will cause transistor 310 to turn on. Therefore, the inversion of the required gray code will appear at the bases of transistors 318 through 326 which act as amplifiers. Approximately 100 millivolts of hysteresis is provided by resistors 328 to avoid any discrepancy due to ripple or rod vibration. With a 6 volt RMS AC excitation, a mechanical hysteresis of less than one-eighth inch results.

When the respective encoder is addressed by making inputs A1 through A7 equal to a logical one, NAND gates 330 through 338 are enabled such that the appropriate gray code will be present on outputs alpha, beta, gamma, sigma and epsilon. Diodes 340 through 348 allow these outputs to be easily wire-ORed with similar signals from all other encoders within the same containment electronics group. Each card is assigned a unique address by the interconnection of the control unit address (in various combinations) to address inputs A1–A7.

The secondary function of the encoder unit is to check for as many failures as possible that may invalidate the gray code generated. This is accomplished primarily by the circuitry shown in the area identified by reference character 34 in FIG. 4B. Upon a number of failures including: open or shorted detector coils; open or shorted cabling from the detector to the containment electronics; open or shorted terminating resistors 200 through 240; shorted input resistors 244 and 350 or 248 and 352; open input resistors 250 and 354 or 246 and 356; shorted protection diodes 254, 256 and corresponding diodes; and failed amplifiers 242, 316, etc., such that they are saturated at +15 volts; an excess voltage will be fed back to the inverting inputs of the amplifiers in the tracking level detector. Since this excessive voltage, like normal signals at this point, is proportional to the AC excitation of the detector, a floating reference is created from the AC excitation. By remote sensing, amplifier 360 and associated circuitry within area 34 of FIG. 4B produces the required floating reference from the voltage on the common of the detector stack, thus avoiding variable voltage drops across the common of the cable to the detector stack. The floating reference voltage present on capacitor 362 is constantly compared to the feedback signal of the tracking level detector by amplifier 364. Should the feedback voltage ever exceed the reference, an error is detected causing the output of operation amplifier 364 to saturate negative, and turn on transistor 366. This prevents the NAND gates 330 through 338 from being enabled even if the respective encoder is addressed; consequently, alpha, beta, gamma, sigma and epsilon will all be a logical one during that address period. This code, among others as shown in the table of FIG. 4C, will be interpreted by the central control unit 20 of FIG. 2 as an error code. Obviously, removal of an encoder unit or loss of the power supply to that unit will result in the same affect. Also, a low frequency square wave generated on the containment input/output interface and present at input F in FIG. 4B will cause a red light-emitting diode 368 located on the encoder unit to flash when that encoder has detected a failure.

A single test point 36 is available on each encoder unit as illustrated in FIG. 4B. When the AC excitation is energized the voltage on the common of that coil stack is available at the respective test points. When all AC excitation is deenergized a rod drop signal (normally employed in standard rod drop tests performed on nuclear plants) for each rod is available on the test point of the respective encoder card associated with that rod. This signal is also brought out on the rear connector of the unit for possible use with an analog multiplexing subsystem which can be added where desired. Approximately 0.2 volts of hysteresis is added to the error comparison by resistor 370.

Accordingly, the encoder unit receives the respective output signals from the corresponding coil stack and processes and encodes the received signals into position information in gray code form which is transmitted to the containment input/output interface to be described.

Containment Input/Output Interface

Figure 5A:
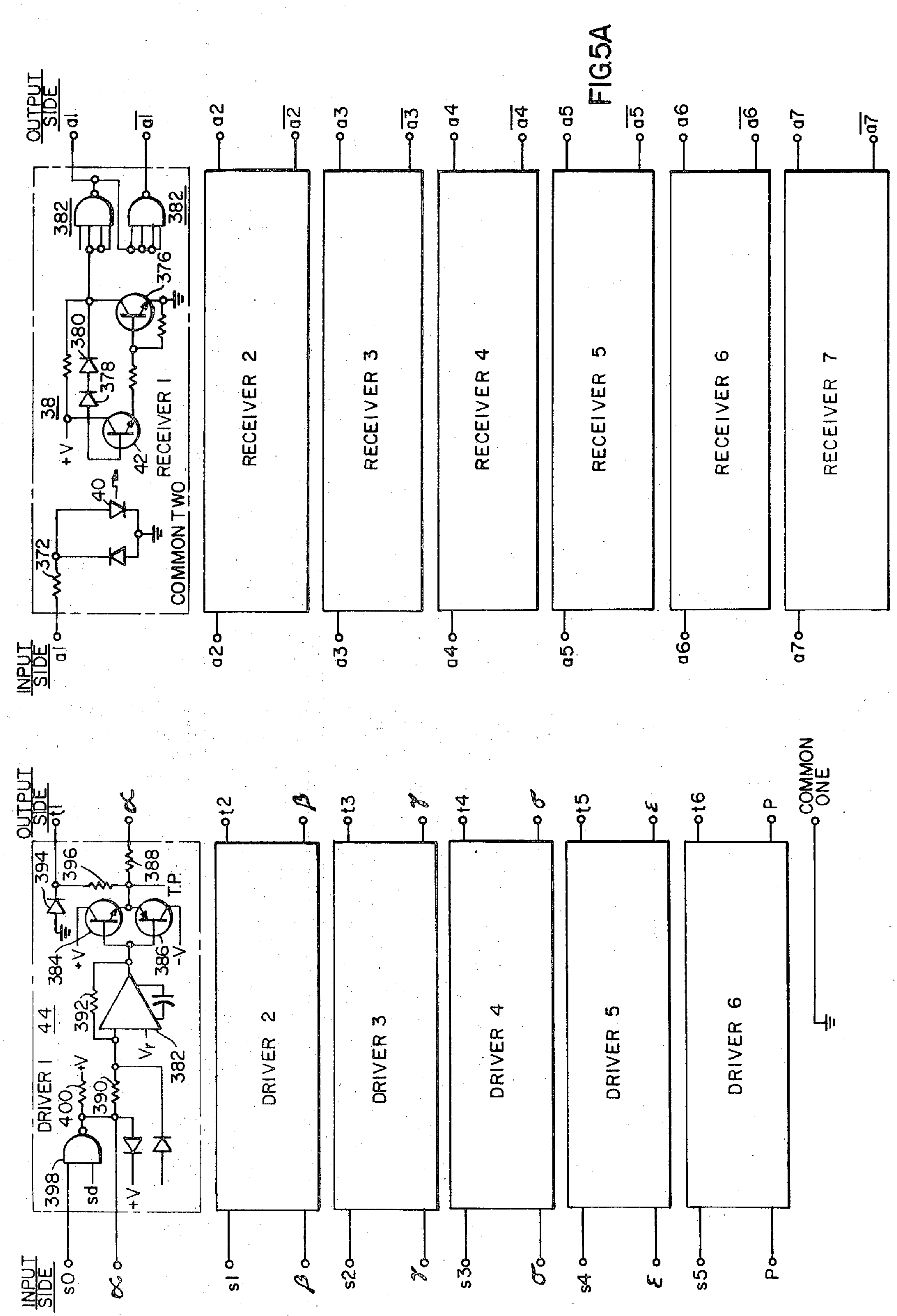
FIGS. 5A and 5B are schematic diagrams illustrating in detail, the containment interface subsystem of FIG. 2.
Figure 5B:
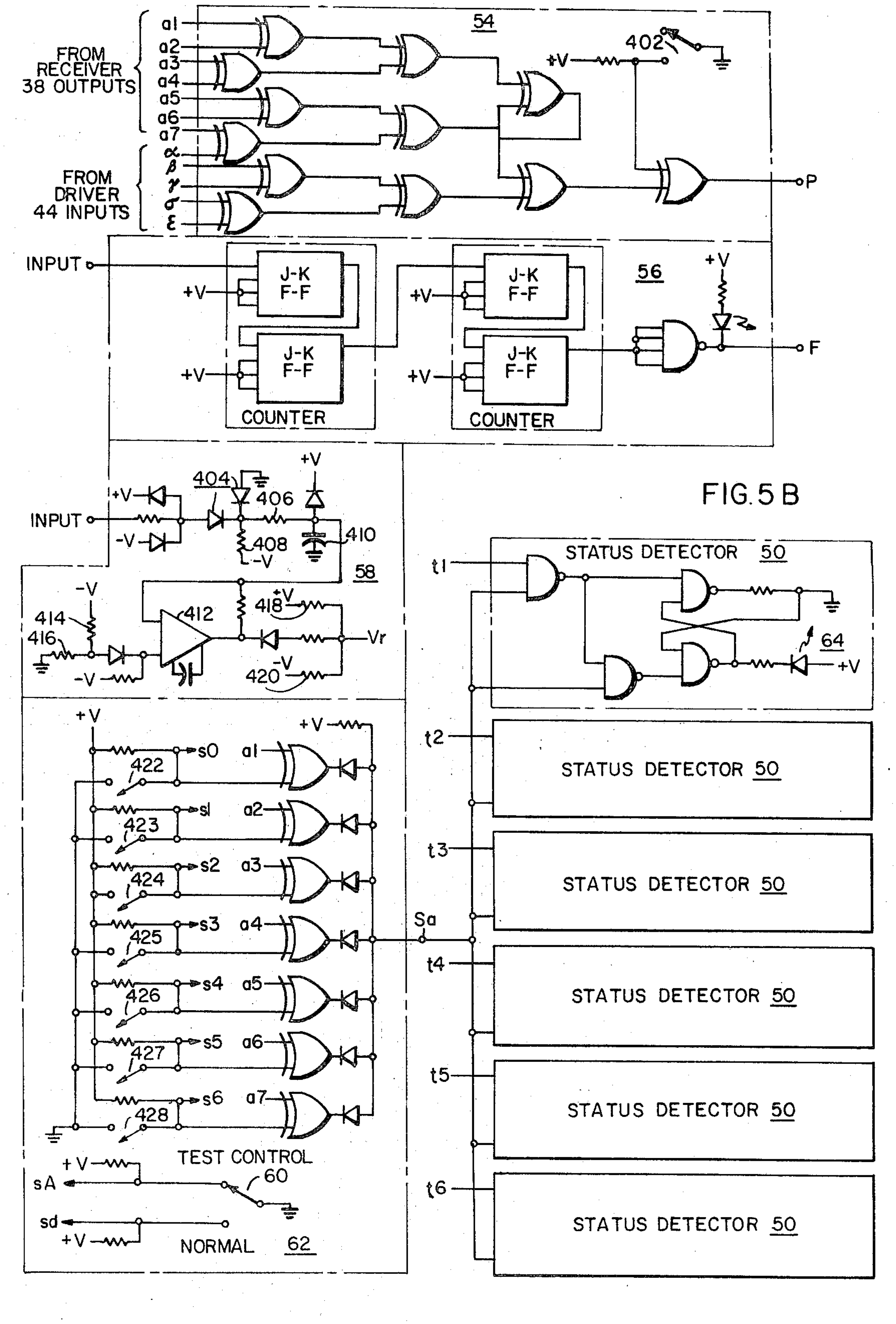

In the exemplary unit shown utilizing two signal trains A and B, there are only two containment input/output interfaces used within the entire system, one in each group of the containment electronics, but they perform six functions basic to signal transfer and vital to the proper operation and maintenance of the system. A schematic diagram of an exemplary input/output containment subsystem is shown in FIGS. 5A and 5B and its interconnection within the system is identified by like corresponding reference characters.

The first function performed by the containment input/output interface is that of receiving address signals from the control room electronics and the buffering of those signals for distribution to the corresponding encoder units of that group while providing complete electrical separation by means of optical coupling. This function is implemented by the differential receiver units 38. The common two connections of this stage will be connected to the signal ground of the control room electronics. Input terminals of the containment input/output receivers 38 in FIG. 5A will be connected to output terminals of drivers 48 located within the control room input/output interfaces shown in FIG. 6A. The input signal at the receivers 38 will swing positive to indicate a logical one and negative to indicate a logical zero. A logical one at the input to 38 will cause the infrared light-emitting diode 40 to be forward biased and emit light proportional to the current limited by resistors 372 of FIG. 5A and 374 of the driver 48 in FIG. 6A. The infrared light passes through a clear dielectric and falls on the collector-base junction of the phototransistor 42 causing conduction of the phototransistor and transistor 376. Diodes 378 and 380 provide non-linear negative feedback for improved response times as described in U.S. application Ser. No. 241,048 (Westinghouse Case No. 43,204) filed Apr. 4, 1972, entitled "Self Optimizing Biasing Feedback for Photo-Electric Transmission Systems" by J. A. Neuner, M. Traversi and D. Santis and assigned to the assignee of the present invention. The resulting signal at the collector of transistor 376 is further buffered by NAND gates 382 for appropriate distribution from the output terminals to the corresponding encoder unit terminals having like reference characters.

The second function performed by the containment input/output interface is that of transmitting data, retrieved from the encoder units by the address code, to the control room. This function is implemented by the circuitry identified by reference character 44 in FIG. 5A. Input terminals of the drivers 44 are connected to all similar output signals of the respective encoding units having like reference characters. Output terminals of the drivers 44 are connected to corresponding input terminals of the differential receivers within the control room input/output interface shown in FIG. 6A and identified by reference character 46. Also, the common one terminals of the containment input/output interface, shown in FIG. 5A, will be connected to the common one terminals of the control input/output interface, FIG 6A. It is obvious that complete separation of the control and containment units is maintained by the optical coupling provided in the differential receivers 38 and 46 shown in FIGS. 5A and 6A. A logical one at input $\alpha$ of the driver 44 shown in FIG 5A will cause amplifier 382 to saturate positive and result in an output at $\alpha$ in the order of 7 volts. In a similar manner a logical zero input $\alpha$ will cause an output signal in the order of −7 volts. Transistors 384 and 386 provide higher current capability than available directly from amplifier 382 while resistor 388 provides current limiting and short circuit protection. Similarly, resistors 390 and 392 provide approximately 0.5 volts of hysteresis. Diodes 394 and resistor 396 provide signal conversion for use by the status detector 50 shown in FIG. 5A. NAND gate 398 and resistor 400 are used by the test circuitry 62 to override normal encoder signals $\alpha$ through $\epsilon$, for maintenance tests. Under normal operating conditions signal $s_a$, generated within the test circuitry 62 as an input to NAND gate 398, assumes a logical zero state disabling NAND gate 398 and resistor 400.

A third function performed by the containment input/output interface is that of parity bit generation. This function is generally implemented by the circuitry 54 illustrated in FIG. 5B. For certain fault conditions even parity was chosen. This means that if a 13-bit binary word were constructed using the address code received from the control room, the data received from the encoder units and the parity bit, the parity bit would be of the appropriate state to make the resulting word always have an even number of ones. The parity bit P is sent to the control room with the 5-bit gray code by the sixth driver shown in FIG. 5A. In this way, since a similar process is being performed on the address sent from and the data received by the control room input/output interface, it is possible to detect a single failure within the data transmission hardware, including the input/output interfaces and interconnecting field wiring. Switch 402 illustrated within the area of the parity circuitry 54 of FIG. 5B serves two functions. Since the opening of the switch 402 inverts the parity bit causing a consistent parity error, it can be used to check the parity check. Secondly, since a parity error causes the data from its corresponding train to be discarded, this switch can be used by a repairman to locally disconnect the entire train without the cooperation of the control room.

A fourth function performed by the containment input/output interface is the generation of a low frequency square wave which activates an alarm light on each encoder unit to flash when an error is detected. The square wave is generated by the 4-bit counter and buffer 56 illustrated in FIG. 5B. The frequency of the F output signal of this circuit is determined by connecting the input to one of the address lines. If connected to the $a7$ terminal of receiver 7 in FIG. 5A, the alarm lights will flash approximately three times per second.

A fifth function is the detection of a failed DC or AC power supply. Such a failure will result in the generation of a 5-bit gray error code 11111 to the control room. This function is generally performed by the detection circuit 58 illustrated in 5B. The input terminal is connected to the AC bus from the transformer. The AC excitation voltage is half-wave rectified and averaged by components 404, 406, 408 and 410. The resulting voltage on capacitor 410, which is proportional to the AC excitation, is then compared by the amplifier 412 to a reference voltage generated by 414 and 416. When the AC excitation is too low, amplifier 412 saturates negative causing the voltage reference $Vr$ supplied to all output drivers 44 to be pulled below ground. In this way, data outputs from the drivers 44, $\alpha$, $\beta$, $\gamma$, $\sigma$, and $\epsilon$ will be forced to the logical one state. In a similar manner, if the DC voltage supply should fail, the reference voltage generated by resistors 418 and 420 will sink below ground and cause the same affect. If the negative DC voltage supply should fail, the drivers 44 would be incapable of pulling the data outputs below ground with the result that those signals would be assumed to be in the logical one state by the differential receivers 46 on the control room input/output interface.

The sixth function provided by the containment input/output interface is that of providing a manual, two part overlapping test of most of the system in order to simplify installation and maintenance. This function is performed by the circuitry and switches shown in area 62 of FIG. 5B. With the test mode switch 60 in the normal position and the system operating, an on-line test of the containment electronics is possible. The status of the gray code and parity being transmitted to the control room and corresponding to the address selected by switches 422 through 428 will be displayed by the visible light-emitting diodes 64 of the status detectors 50. A complete check of the corresponding rod's channel of containment electronics can be accomplished by moving the rod from bottom to top either mechanically or by simulation. When the test mode 60 switch is in the test control position, the status present on switches 422 through 426 will be substituted in place of the 5-bit gray code from the encoder units for all rods and this position will be displayed by the status detectors 50. In this way, the control room electronics can be tested by simulating the movement of all rods simultaneously in gray code with switches 422 through 426.

Accordingly, the containment input/output interface performs the aforedescribed six functions which enhance the operation and maintenance of the entire system.

Control Input/Output Interface

Figure 6A:
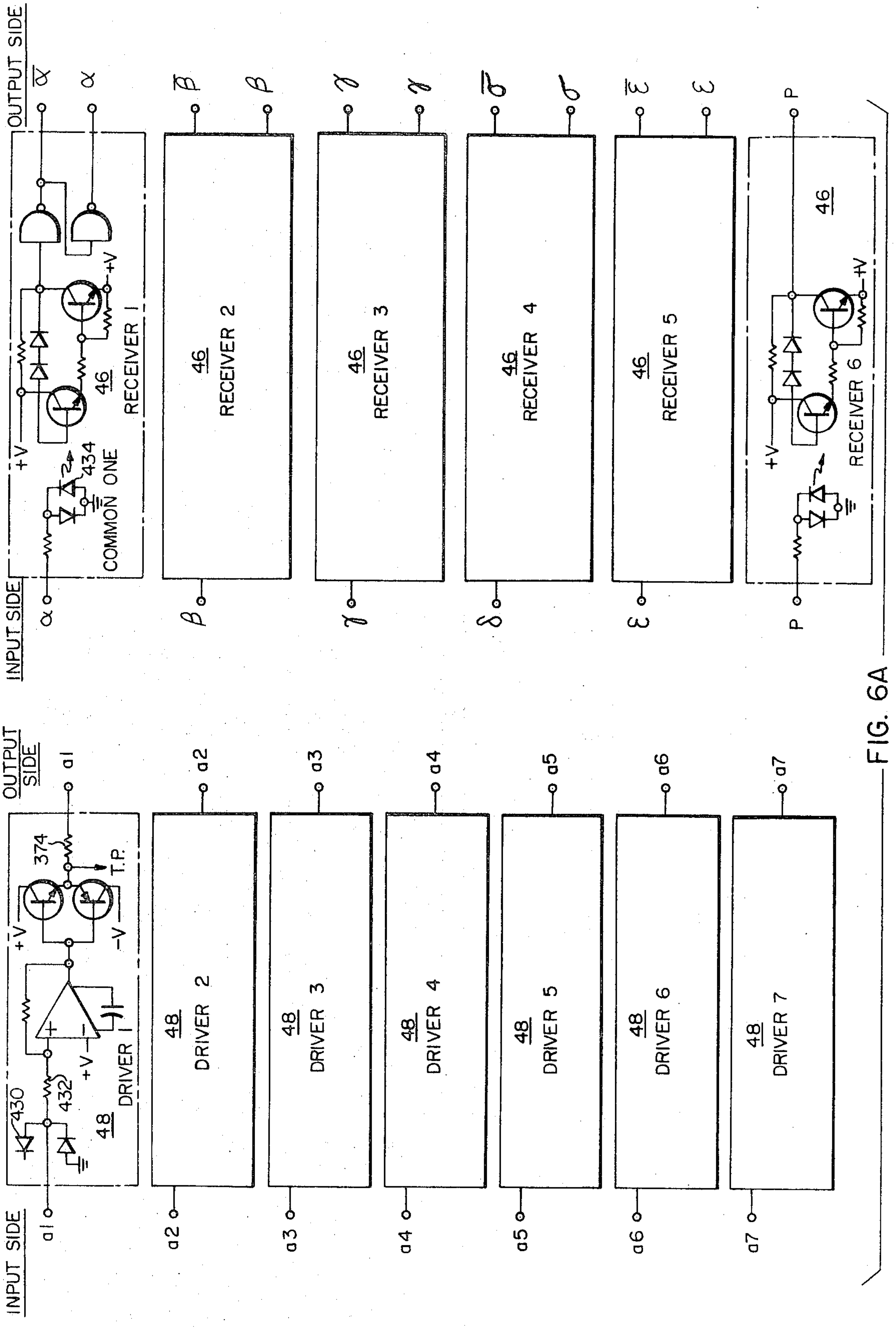
FIGS. 6A and 6B are schematic diagrams illustrating in detail the control room interface of FIG. 2.
Figure 6B:
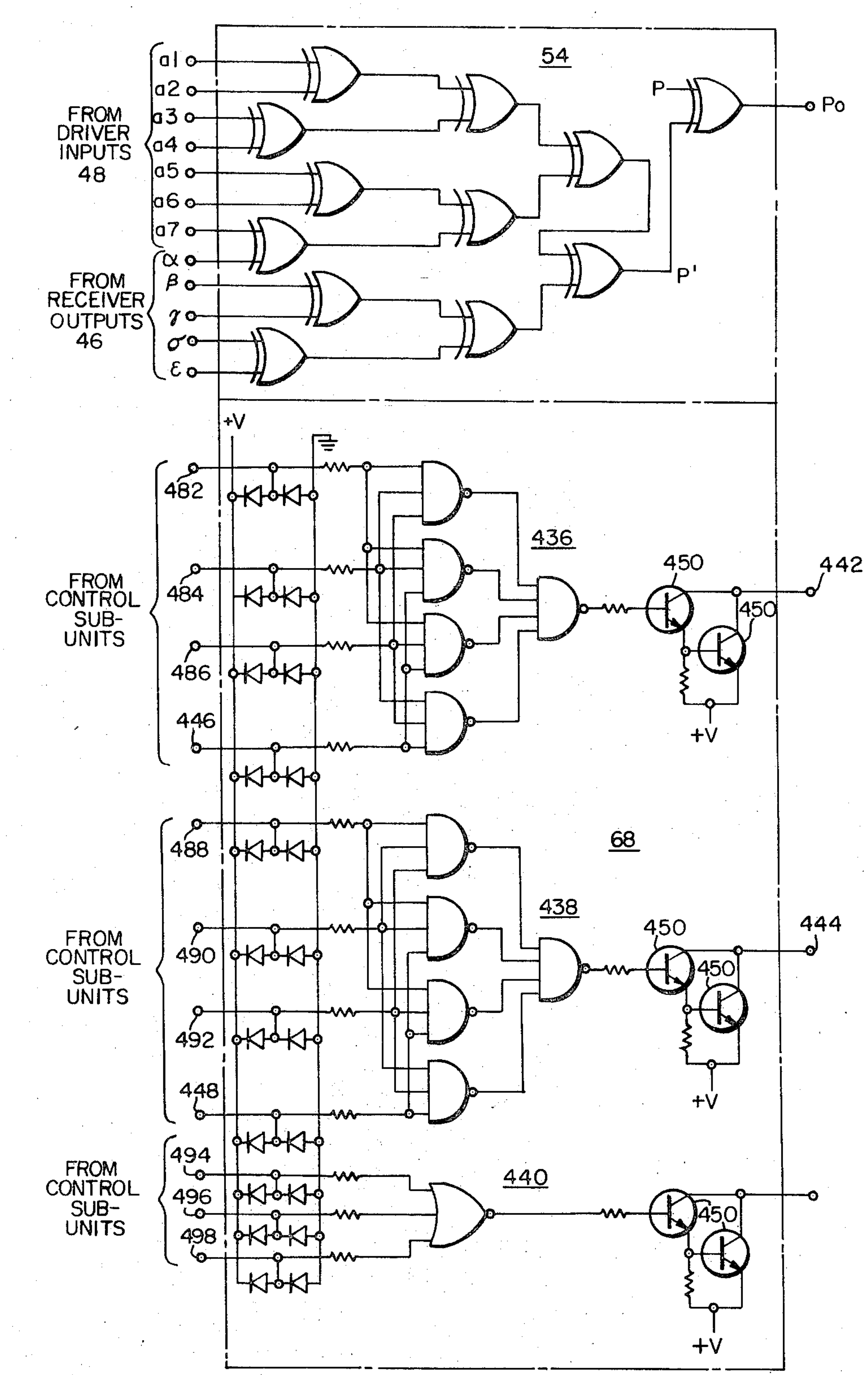
Figure 18:
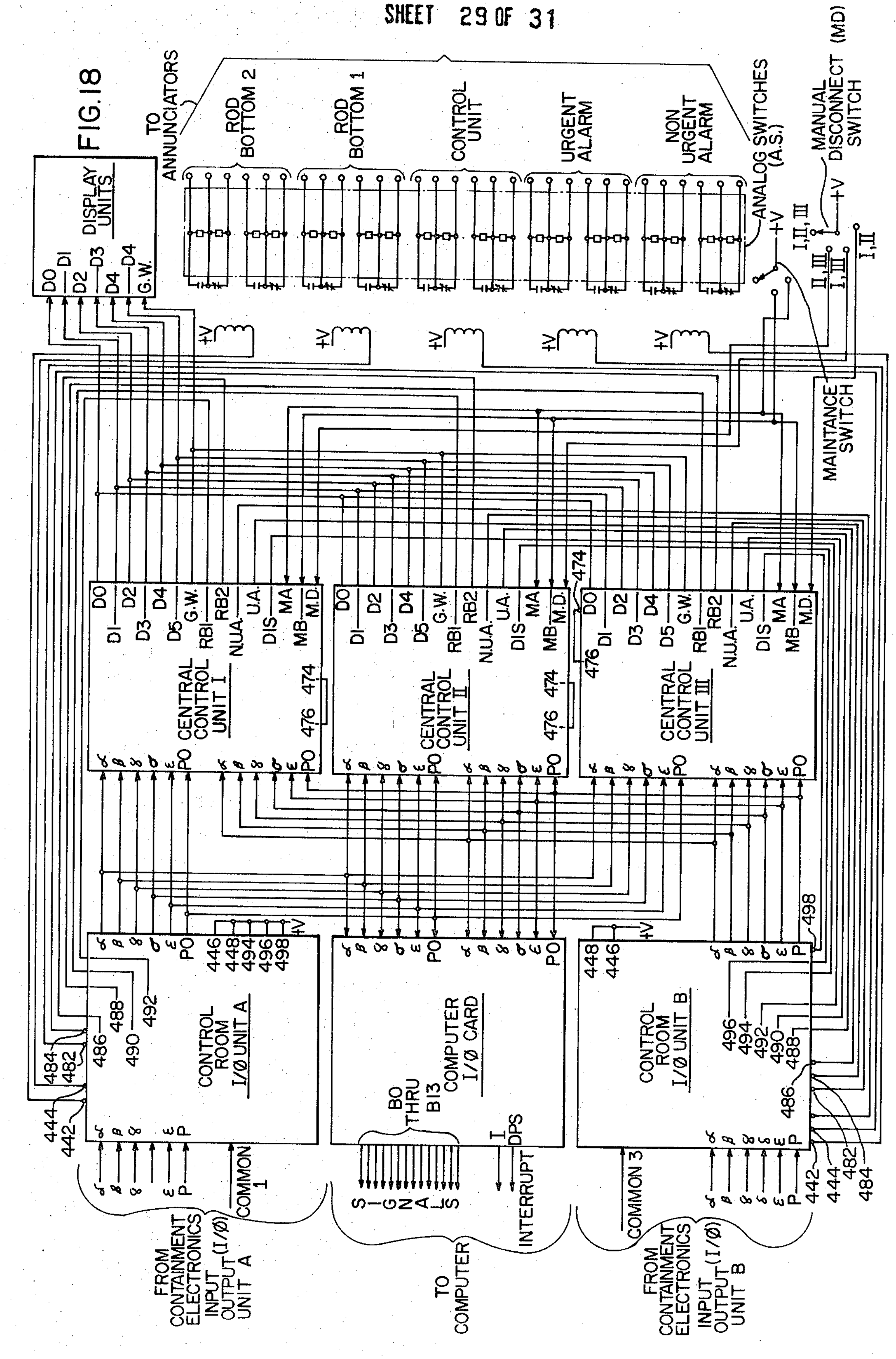
Figure 19:
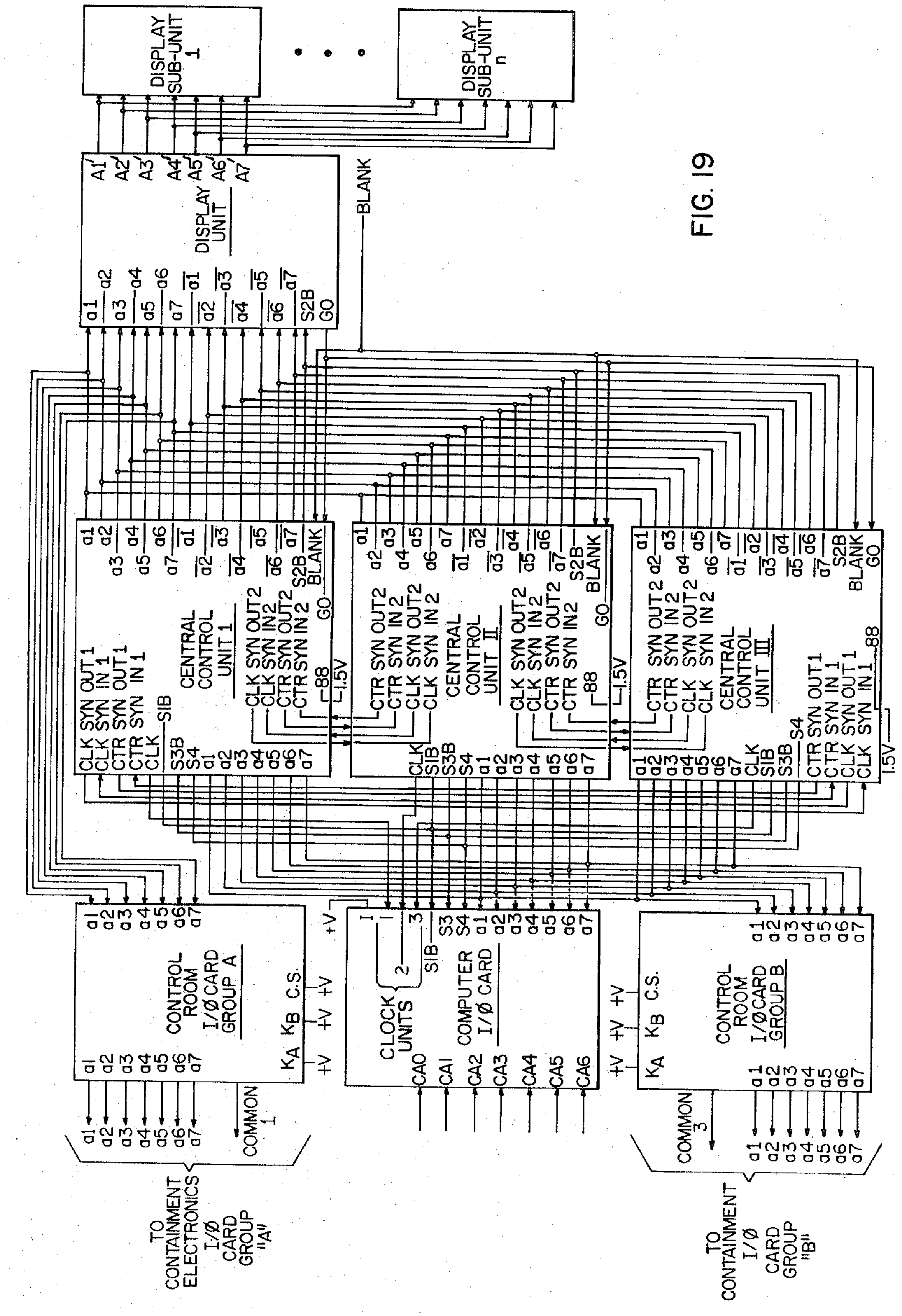

Like the containment input/output interfaces only two control room input/output interfaces are required per system but they provide four functions basic to signal transfer and vital to the proper operation and maintenance of the system. A schematic diagram of the interface is illustrated in FIGS. 6A and 6B and its interconnection with the control room electronics is shown in FIGS. 18 and 19.

The first function performed by the control room input/output interface is that of providing addresses from the central control unit 20 of FIG. 2 to the containment electronics by means of a minimal number of field wires, terminations, and penetrations in order to retrieve the rod position data in gray code. This function is provided by the circuitry 48 shown in FIG. 6A. Driver 48 output terminals are connected to the differential receiver 38 input terminals of the containment input/output interface shown in FIG. 5A and the control room ground, common two, of the control room input/output interface is connected to the common two connection of the containment input/output receiver 38. The drivers 48 perform in a manner similar to the containment input/output drivers 44 previously discussed. Diodes 430 and resistors 432 provide additional input protection for the COS/MOS circuitry.

In this embodiment, addresses generated by the central control 20 of FIG. 2 are applied to the corresponding inputs of the drivers 48. The driver 48 output terminals (e.g., $a_1^1$) will swing to a logical one state when a logical one input is applied to the corresponding input terminal.

The second function performed by the control input/output interface is that of receiving data retrieved from the containment by the address code. This is accomplished by the circuitry 46 of FIG. 6A. This circuit performs in a manner similar to the differential receivers 38 on the containment input/output interface previously described except that a corresponding logical one at an input will turn off the associating light-emitting diode 434 and cause a logical one at the output terminal.

The third function performed by the control input/output interface is the parity check which is performed by the circuit 54 in FIG. 6B which is analogous to the circuit 54 illustrated in FIG. 5B. Here, a parity bit is generated P′ in a manner similar to the one generated on the containment input/output interface except the address from the central control unit 20 of FIG. 2 and the data received from the containment, as illustrated by the corresponding input reference characters, are used for this purpose. This parity bit P′ is then compared to the parity bit received from the containment P to generate a signal P*o* for transmission to the control unit 20. If no parity error exists, then signal P*o* will be a logical zero. If, however, a parity error does exist, then P*o* will be a logical one and will command the control unit 20 to discard the data from the appropriate group for the corresponding rod and present the position of the rod using only the data from the other group.

The fourth function of the control input/output interface is to receive alarm and rod bottom signals from the central control unit 20, perform two-thirds (majority vote) logic or one-third logic (as described in copending application Ser. No. 320,775, Westinghouse Case No. 44,170, cited above), and to use the resulting signal to control output relays. This is accomplished by the programmable buffer circuits 68 shown in FIG. 6B. Circuits 436 and 438 will each receive three signals (one from each control subunit within the control unit 20). These signals will be a logical zero if deenergization of the corresponding outputs 442 and 444 are requested. If the fourth inputs 446 and 448 are made a logical zero, then the circuit will be programmed to deenergize the output upon the request of one or more of the three input signals. If the fourth input is a logical one, then the circuit will be programmed to deenergize the corresponding output upon the request of two or more of the three input signals. The third circuit 440 is a one-third circuit for signals which present a logical one to request deenergization of the output. These circuits are connected as shown in FIG. 18 so that two-thirds logic is performed on rod bottom signals and one-third logic is performed on alarm signals. Transistors 450 provide sufficient drive capability to sink up to 150 milliamps in order to drive the output leads.

Accordingly, this unit provides four functions which enhance the proper operation and maintenance of the entire system.

Central Control Unit

Figure 7A:
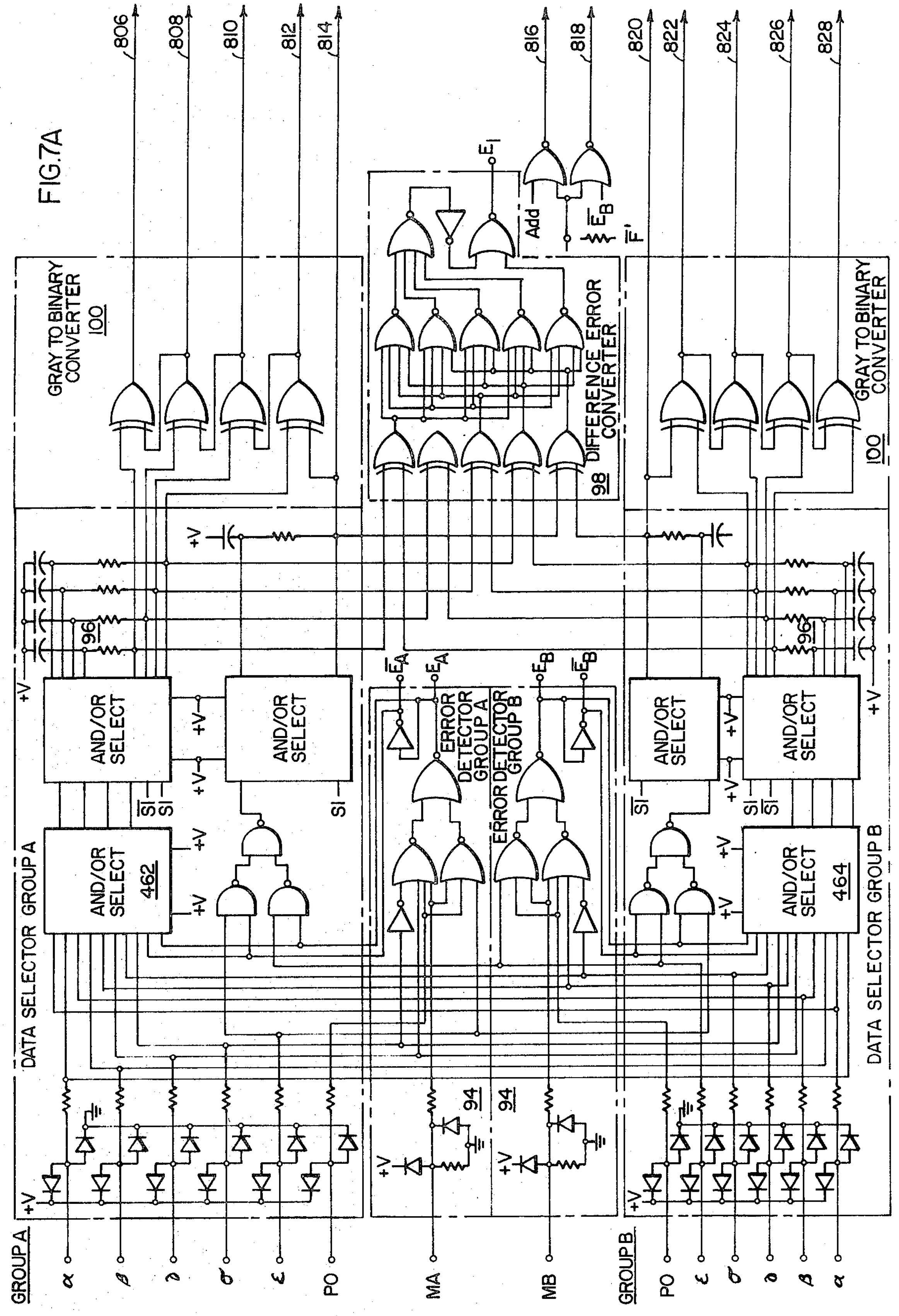
FIGS. 7A and 7B are schematic circuitry diagrams of one portion of the central control subsystem of FIG. 2.
Figure 7B:
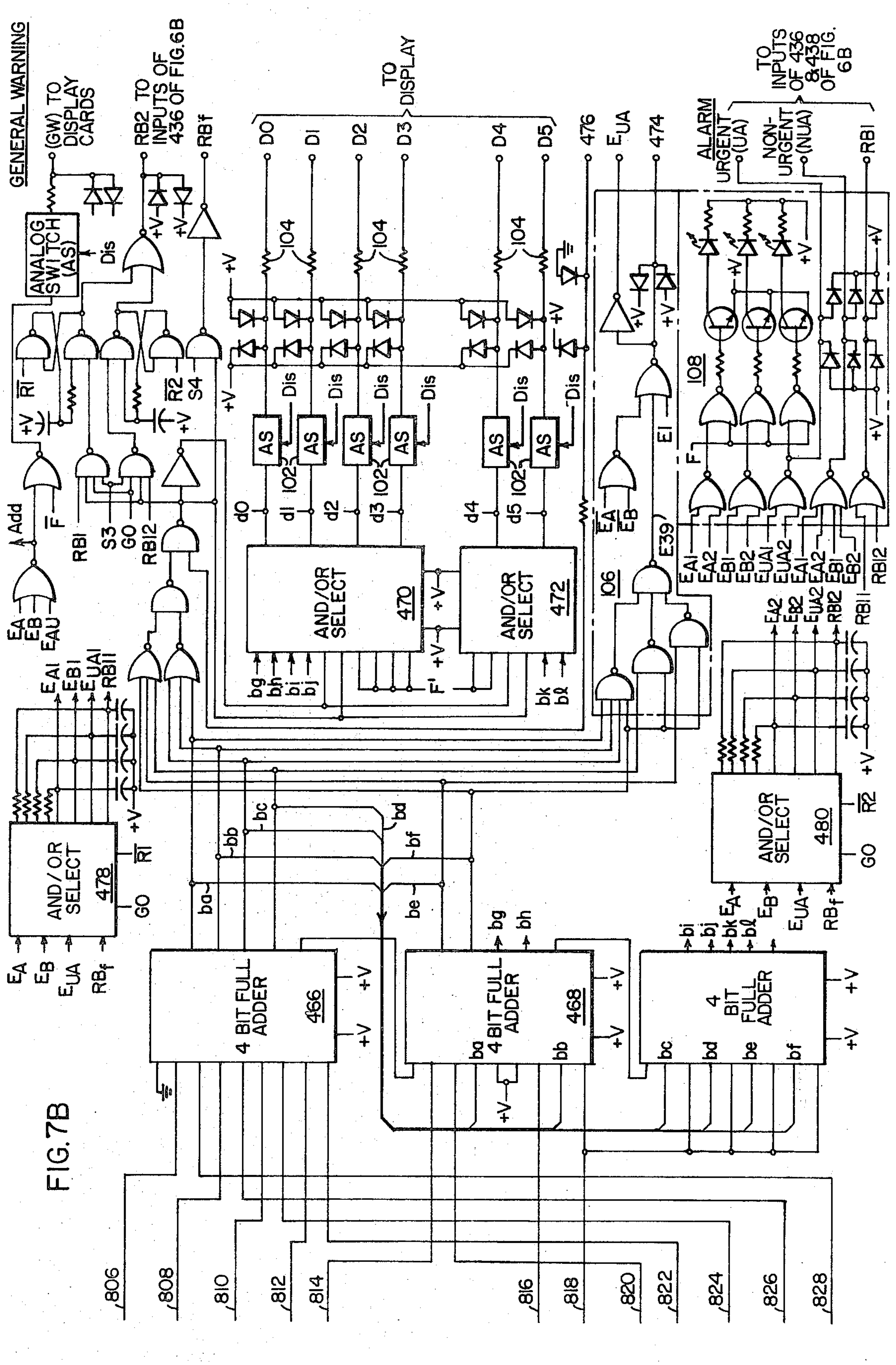
Figure 8A:
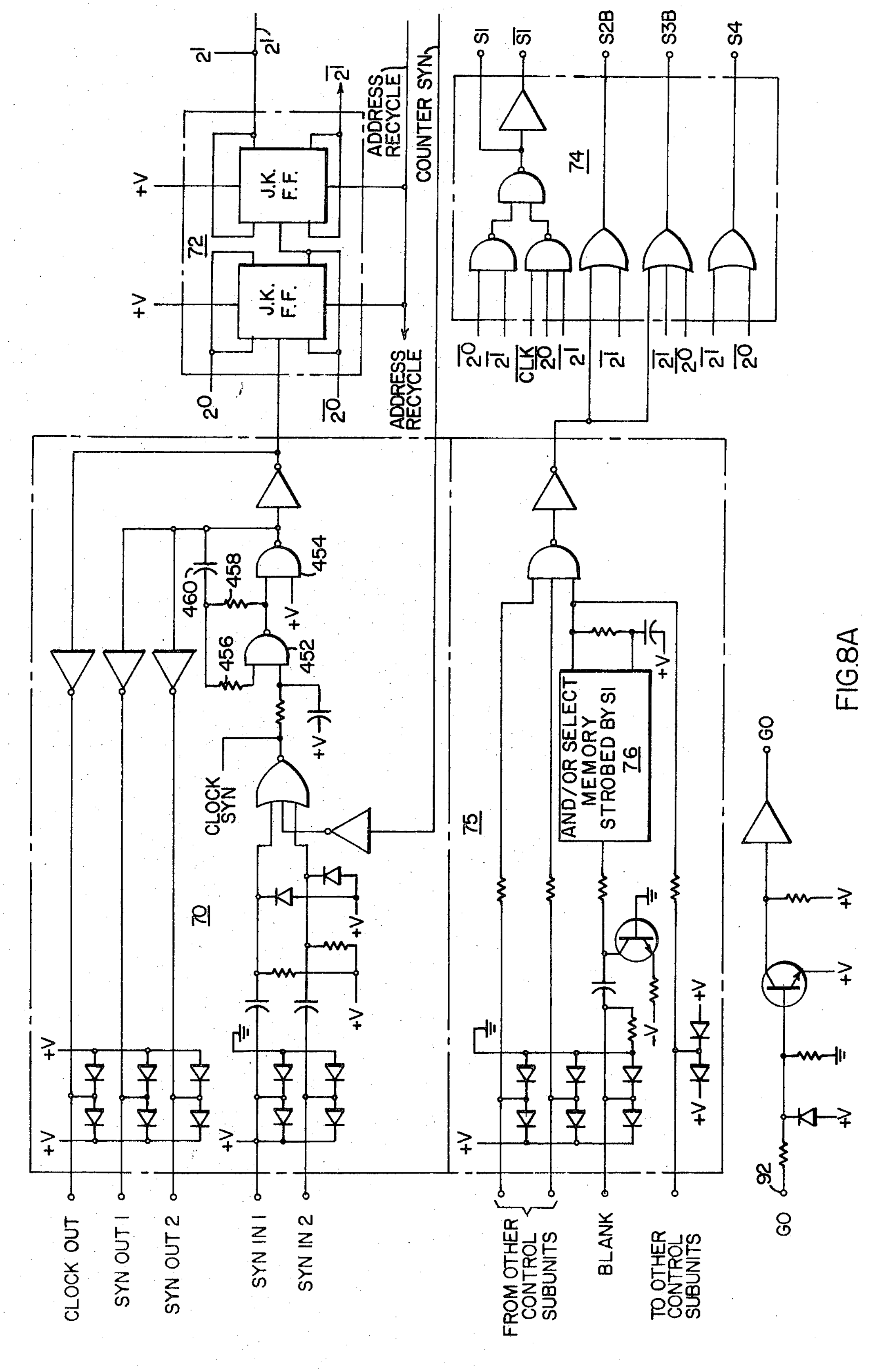
FIGS. 8A and 8B are second schematic circuitry diagrams illustrating the sequencing electronics of the control subsystem of FIGS. 7A and 7B.
Figure 8B:
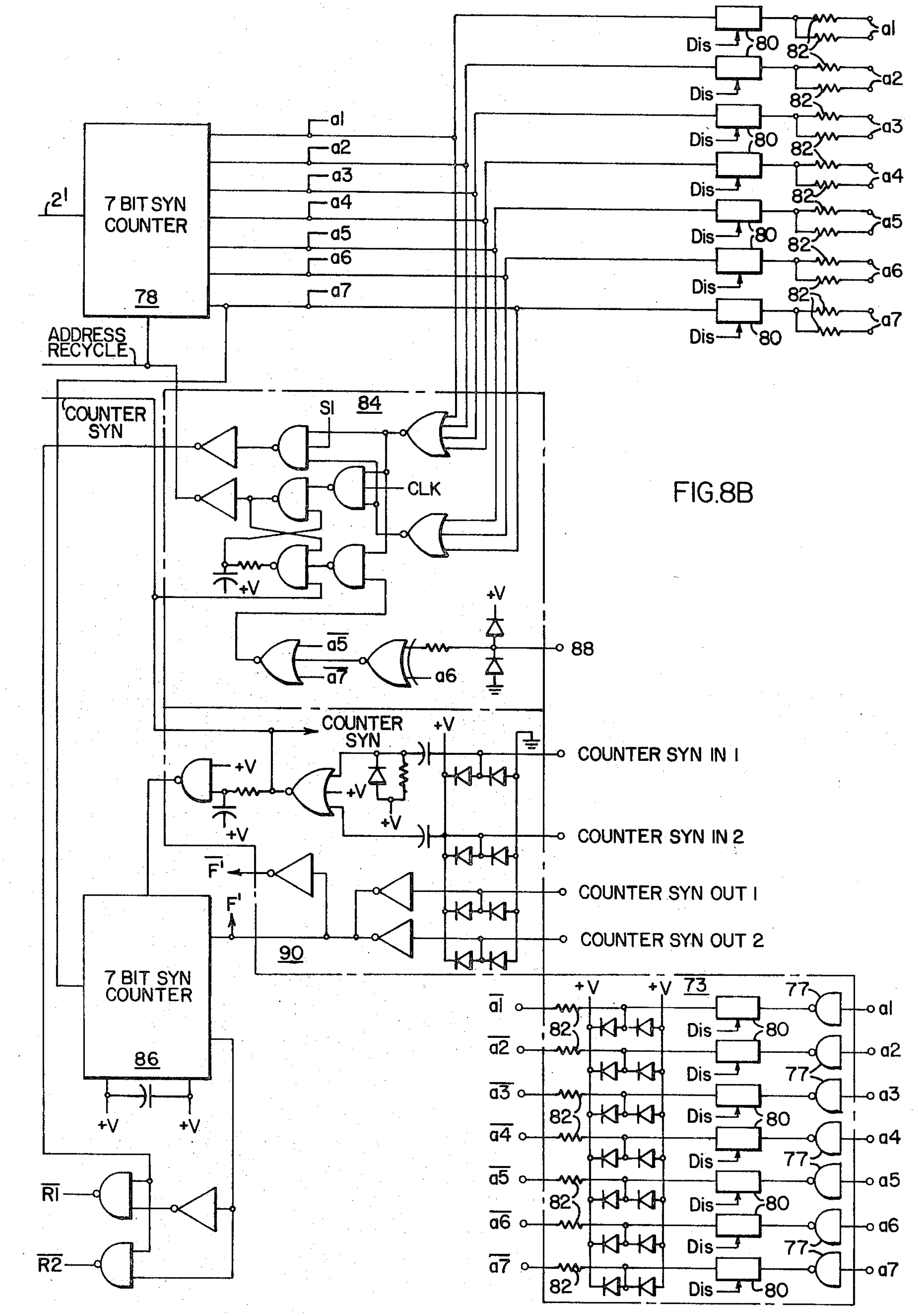
Figure 9:
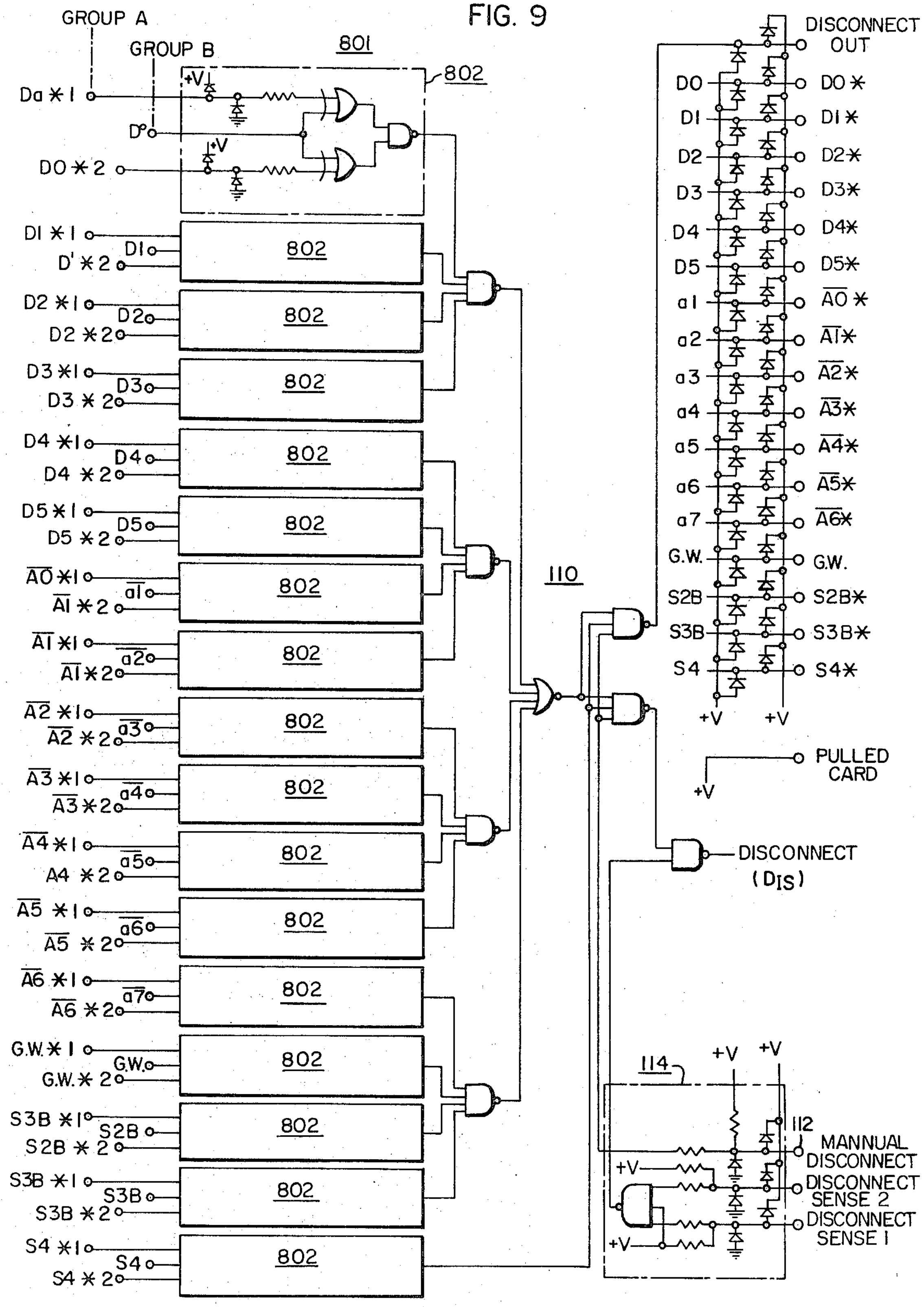
FIG. 9 is a schematic circuitry diagram illustrating the malfunction monitoring portion of the control subsystem of FIGS. 7A and 7B.
Figure 20:
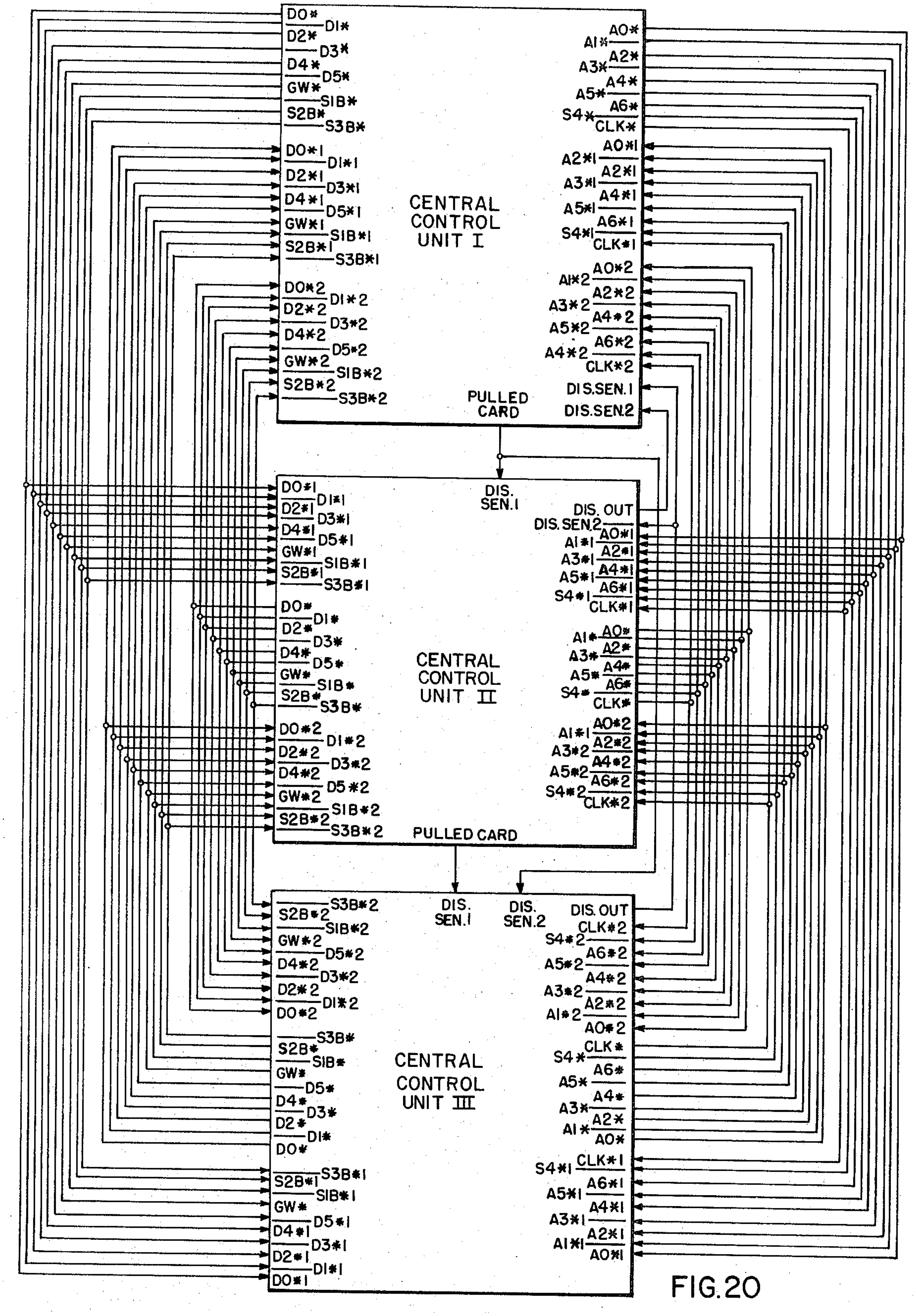

The central control unit 20 of FIG. 2, contained within the reactor control room electronics, effects signal retrieval and controls every vital operation within the system including sequencing, data processing and error detection. Consequently, in the embodiment using two independent signal trains to carry the information, it represents the only common area controlling both redundant detection and multiplexing units and the separate display units (control board display and computer to be described hereinafter). Therefore, to increase the system's reliability the central control unit 20 is composed of three identical central control subunits performing identical operations. Control of the system by these three subunits is accomplished by a reliable majority vote logic scheme which forms the subject matter of copending application Ser. No. 320,775 (Westinghouse Case NO. 44,170) cited above. In this way, if a single failure should occur, the system would continue to operate properly using the remaining two good central control subunits. Similarly, separate buffered outputs are provided to control the control board display and computer or the separate groups of containment electronics. The central control unit, then, performs three general functions: data processing including necessary error detection as illustrated in FIGS. 7A and 7B; generation of sequencing signals as illustrated in FIGS. 8A and 8B; and detection of control unit failure as illustrated in FIG. 9. Interconnection of each central subcontrol unit is shown in FIGS. 18, 19 and 20.

Figure 10:
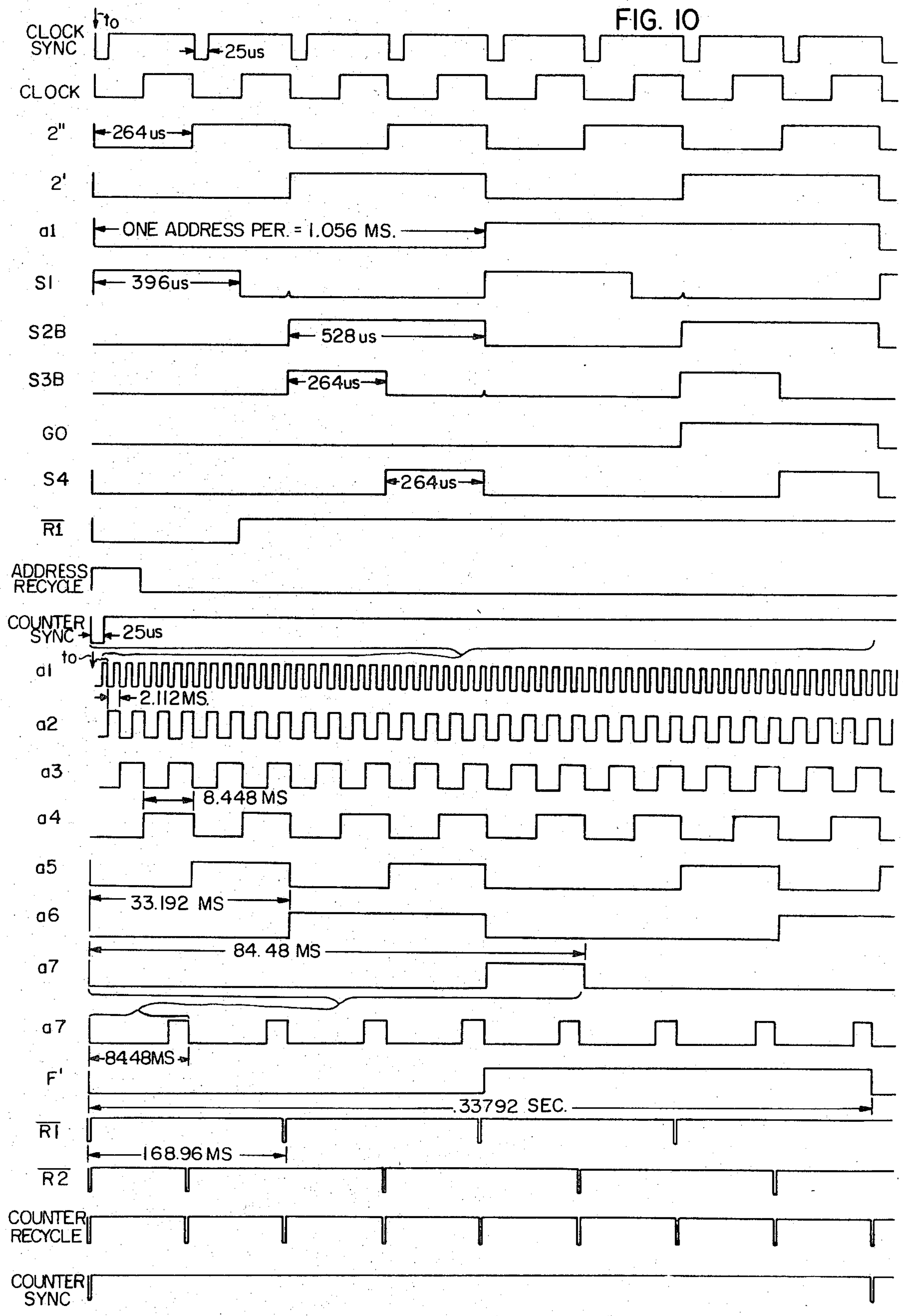
FIG. 10 is a graphical illustration of the timing of events occurring within the central control system of FIGS. 7A and 7B.

The circuitry shown in FIGS. 8A and 8B is used to generate the sequencing signals illustrated in the timing diagram of FIG. 10. The circuitry generally identified by reference character 70 produces a basic clock capable of being synchronized with two other clocks of a similar nature present within the two other control subunits. The basic clock is composed of the two NAND gates 452 and 454, resistor 456 and, 458 and capacitor 460 and has a typical period in this exemplary embodiment of 264 microseconds. The clock 70 is synchronized by a positive transition at either SYN IN 1 or SYN IN 2. Consequently, the fastest clock among control subunits will synchronize the other two. The clock on each subunit then drives a 2-bit counter 72 whose outputs are employed by the circuitry generally described by reference character 74 to generate four strobe signals. Strobe S1 will be a logical one for the first three-eighths of each address period, strobe S2B will be a logical one for the second half of each address period, strobe S3B will be a logical one for the third one-fourth of each address period and strobe S4 will be a logical one for the fourth one-fourth of each address period as illustrated in the timing diagram of FIG. 10. These strobes will be used by the data processing circuitry shown in FIGS. 7A and 7B, by the display units, and in the computer input/output interface. Strobes S2B and S3B can be temporarily disabled by the input signal "BLANK" and its associated circuitry 75 should interference become a problem. This would prevent the updating of the display, alarm and computer input/output circuitry with erroneous information. The BLANKING signal is sampled by strobe S1 in the electronics 76 (and/or select) and is capacitively coupled to prevent failures in the rod control system from permanently disabling the rod position indication system by BLANKING. To prevent erroneous disconnection of any control units by the majority vote circuitry, when the BLANK signal times out (disconnects after a designed time period) in any one unit, the BLANKING signal enables the strobe on all three control subunits. The last bit of the 2-bit counter, 72, $2^1$, then drives a 7-bit counter 78 in FIG. 8B to produce the 7-bit address codes a1–a7. The address codes first pass through an analog switch 80 controlled by the first level of majority vote logic and then through the output resistors 82 to separate output terminals. The resistors 82 maintain separation between the output terminals as well as implement the second level of majority action of resistors 82. Since the rest of the system controlled by this node is a voltage controlled, high impedance input with a threshold of approximately one-half of the power supply, threshold logic is implemented and the signal will usually be accepted as a logical one (the vote of two out of three subunits). The circuitry 73, utilizing NAND gates 77 in FIG. 8B, switches 80 and resistors 82 performing in a like manner to distribute the invert address signals. This circuitry 84 shown in FIG. 8B resets the 2-bit and 7-bit counters 72 and 78 after cycling through the appropriate number of addresses. A logical zero at the recycle program terminal 88 will cause counter 78 to reset after eighty addresses while a logical one at the recycle program terminal 88 will cause the counter to reset after 112 addresses (to cover any possible desired future expansion of the system). The last bit of the 7-bit counter 78 clocks the second 7-bit counter 86 to produce the flash signal $\underline{F'}$ (approximately 3 Hz) and the reset signals $\overline{R1}$ and $\overline{R2}$ as shown in the timing diagram of FIG. 10.

The circuitry shown generally by reference character 90 is used to synchronize the counter once each complete cycle. Again the counter SYNC inputs are sensitive to a positive transition and the first counter to complete a full cycle will synchronize the other two by resetting all counter bits to a logical zero state. The GO signal 92 in FIG. 8A will be a logical one whenever a display unit exists and has been addressed and strobed as more fully described in copending application Ser. No. 320,774 (Westinghouse Case No. 44,071) cited above. This signal will be used in the data processing operation of the central control unit to enable alarm circuits only when the data is valid, that is, when a rod exists for the address being processed. The corresponding circuitry assocaited with the GO signal is merely provided to condition the signal to be compatible with the control circuitry shown in FIGS. 7A and 7B. This accessory enables the system to be easily expanded without complicating the internal circuitry employed.

For each address code generated by the sequencing portion of the central control unit, the position of a particular rod is retrieved in gray code form from the containment encoder units via the containment and control room input/output interface units previously described. For each gray code, the P*o* signal from the control input/output interface, is brought into the inputs of the central control unit illustrated in FIG. 7A and shown in FIG. 18. The diodes and resistors serially coupled to these inputs provide additional protection for the COS/MOS circuitry. Resistors associated with the inputs $M_A$ and $M_B$ from local maintenace switches force these inputs to be a logical zero when left floating. The gray code inputs alpha, beta, gamma, sigma, epsilon in FIG. 7A, are first selected by the circuitry 462 and 464 (and/or select units) controlled by the circuitry 94 in FIG. 7A. If an error code, 11111 ($\alpha$, $\beta$, $\gamma$, $\sigma$, $\epsilon$) is found in a gray code or the corresponding P*o* signal is a logical one indicating a parity error or if the corresponding maintenance switch (associated with either $M_A$ or $M_B$) has been set to reject a group of data by causing the M inputs ($M_A$ being associated with train A and $M_B$ being associated with signal train B) to be a logical one then the data affected will be discarded and replaced with the other gray code from the other train. If train B is affected for example, signal $E_B$ will be a logical one and will be used to generate a a non-urgent alarm and a general warning on the affected rods displayed now operating at half resolution within the control room display unit. The gray codes thus presented are memorized by the filtered memories 96 during strobe S1 (the first three-eighths of each address period). The gray codes from each group are then compared by the circuitry 98 in FIG. 7A. If a difference of more than 1-bit exists then an error exists in one or both of the pieces of data and $E_1$ will equal a logical one, and will be employed to sound an urgent alarm and force a rod bottom indication and general warning display indication on the rod affected. The two gray codes, thus memorized and compared, are converted to a binary code by the Exclusive-OR's 100 and combined by algebraic addition using adders 466 and shown in FIG. 7B. At this point, the absolute position of the rod with maximum possible accuracy and in binary code is available. AND/OR selects 470 and 472 select either the absolute position of the rod in binary or the flash signal F′ for distribution to the display. When the flash signal F′ is chosen and if F′ is a logical one, no light-emitting diodes, except possibly the general warning, will be on; and if F′ is a logical zero, the rod bottom light will be commanded. The affect is that of forcing a flashing rod bottom either upon rod bottom or upon an urgent alarm which is left as an option to be implemented by a jumper connection from terminals 474 to 476. The resulting rod position to be displayed will pass through the analog switches 102 (unless this control unit has been found to be defective), through the output resistors 104 (which again implements the second and back-up level of the majority vote by threshold logic) to the output terminals for transmission to the display. The diodes provide additional protection for the COS/MOS circuitry. The corresponding display data outputs of all control units are wired in parallel for distribution to the display as illustrated in FIG. 18. The circuitry 106 generates the urgent alarm signal ($E_U$A) if the true position of the rod from the adders 466 and 468 in binary are found to be greater than thirty nine in binary ($E_{39}$) or the gray codes differ by more than one bit ($E_1$) or if errors are found in both gray codes simultaneously ($E_A$ and $E_B$). AND/OR selects 478 and 480 each scan the error signal ($E_A$, $E_B$ and $E_U$A) and the rod bottom signal gated by S4 (which is a logical one during the fourth one-fourth of each address period) for two consecutive cycles through the address codes before being cleared by $\overline{R1}$ or $\overline{R2}$. However, the two consecutive cycles 478 overlap the two consecutive cycles of 480 by one complete cycle as shown by the $\overline{R1}$ and $\overline{R2}$ signals in the timing diagram of FIG. 10. The memorized outputs of 478 and 480 are combined by the NOR logic 108 in FIG. 7B to control the flashing local alarm light-emitting diodes as well as to provide outputs for eventual control of alarm and rod bottom bistables via control room relays.

The third major function of the central control unit, that of the majority vote control of the system, is implemented by the circuitry shown in FIG. 9 and the interconnection of this portion of the central control unit as shown in FIG. 20. The circuitry 110 of FIG. 9 compares all significant control signals generated by a particular control subunit with the equivalent signals from the other two central control subunits. If any signal disagrees with both equivalent signals, then the deviating control subunit is assumed to have failed and will be disconnected from the system by making signal $D_{IS}$ equal to a logical one, opening all of the analog switches associated with the failed subunit. This would also cause a local alarm on the control subunit affected and cause the failed control subunit output load to de-energize. This signal can be used directly or combined with the urgent or non-urgent alarms to control a control board display annunciator. In addition, any one control subunit can be cut out of the system by the use of a control subunit cutout switch which will place a logical one on the appropriate manual disconnect input 112. This function will, however, be overridden by the circuitry 114. It is most important that at no time should all central control subunits be disconnected from the system as would be the case under multiple failure conditions. Therefore, a priority is given to each central control subunit. In this embodiment, control subunit I is given the highest priority such that if the other two subunits either disconnect or are removed it will continue to control the system. If control subunit I is removed than control subunit II, with the second highest priority, will refuse to disconnect if control subunit III has disconnected. Finally, if both control subunits I and II are removed control subunit III will refuse to disconnect under any circumstances. The priority is implemented by the interconnection of control subunits as provided in the wiring diagram of FIG. 19. All local and remote alarms will continue to function even if a control subunit is prevented from disconnecting.

Accordingly, the central control unit controls every vital operation within the system remaining as the only common area controlling both redundant detection and multiplexing units and the separate display unit.

Display Cards

Figure 11A:
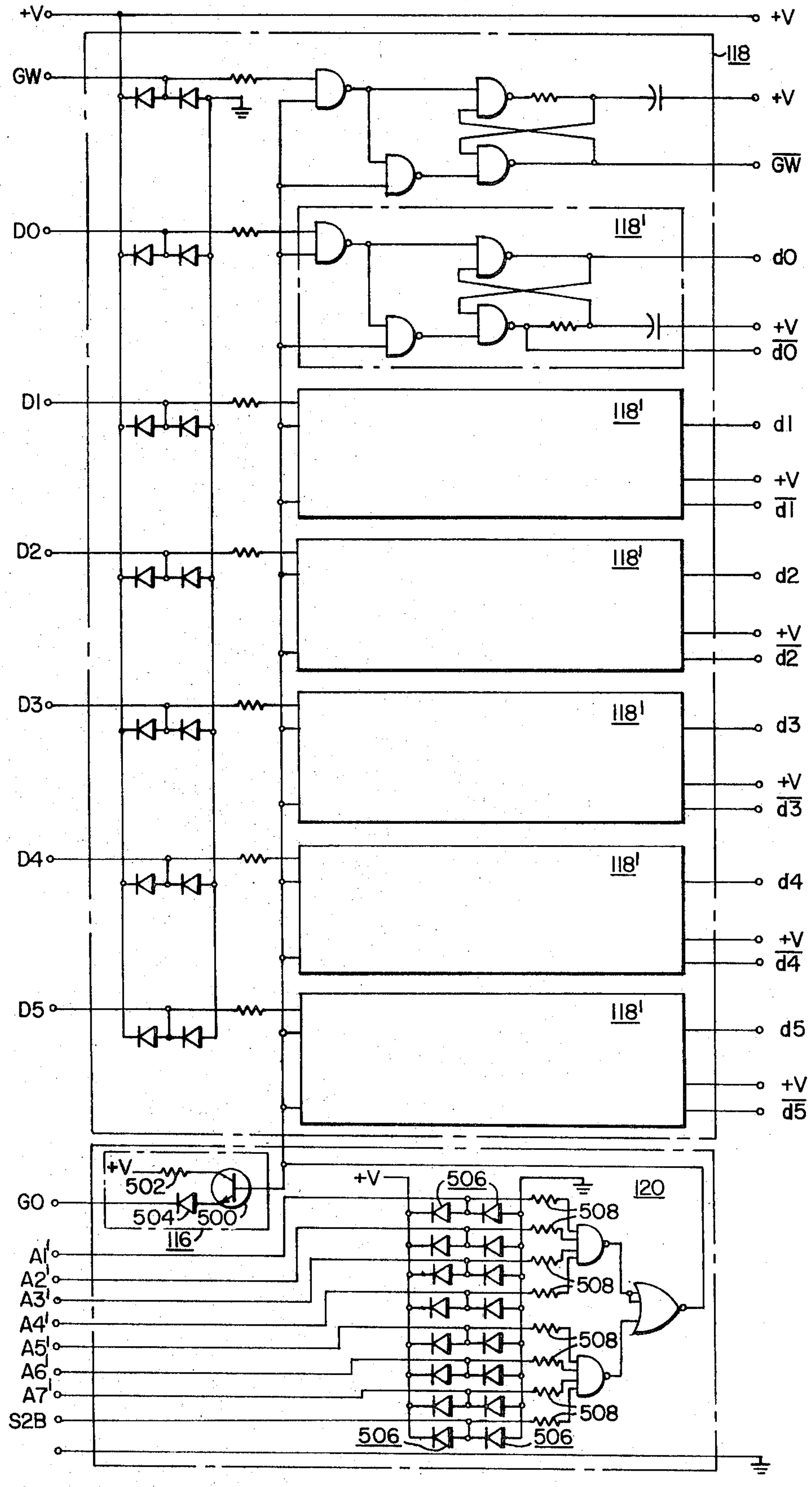
FIGS. 11A and 11B schematic circuitry diagrams of the output display of FIG. 2.
Figure 11B:
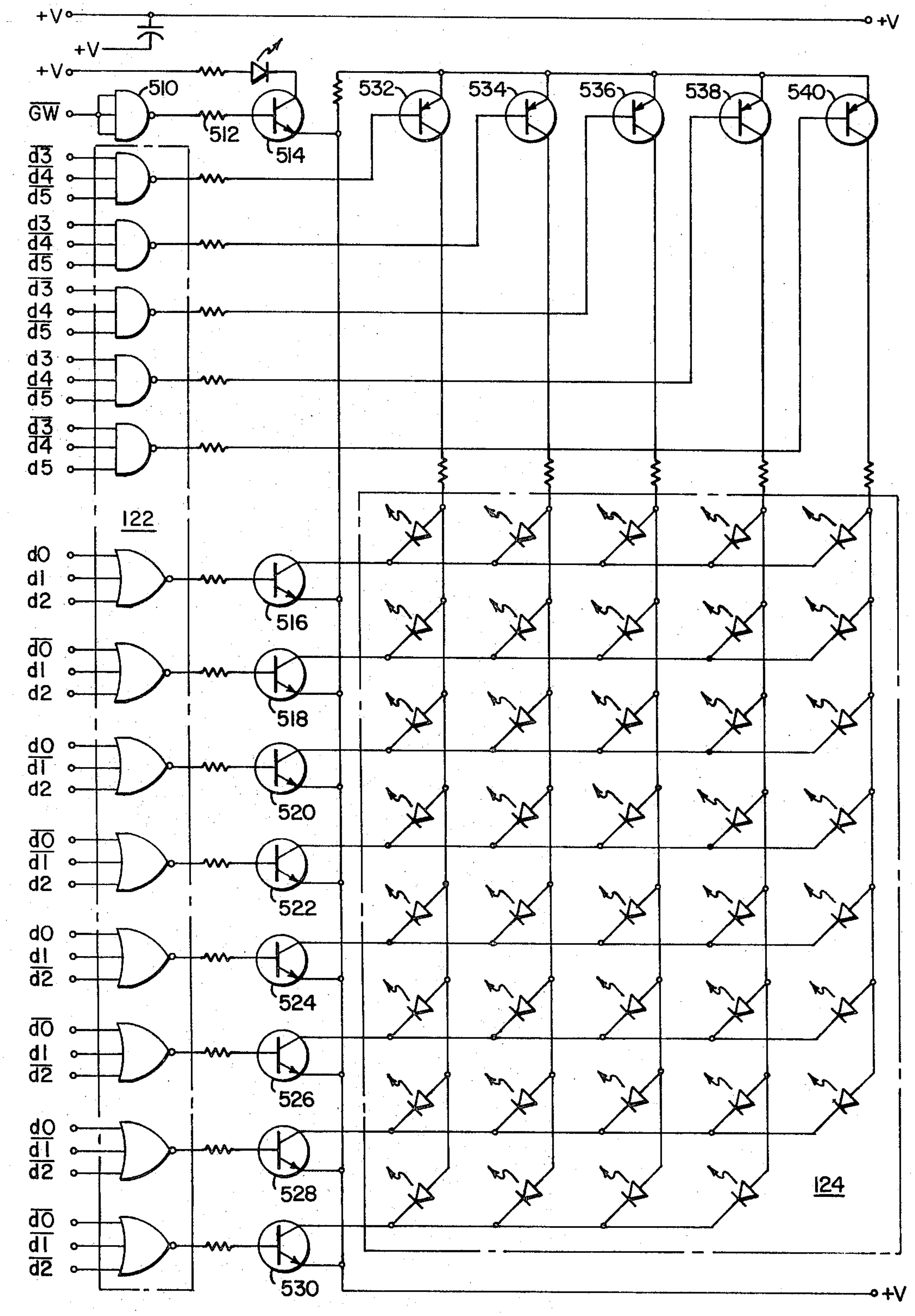
Figure 12:
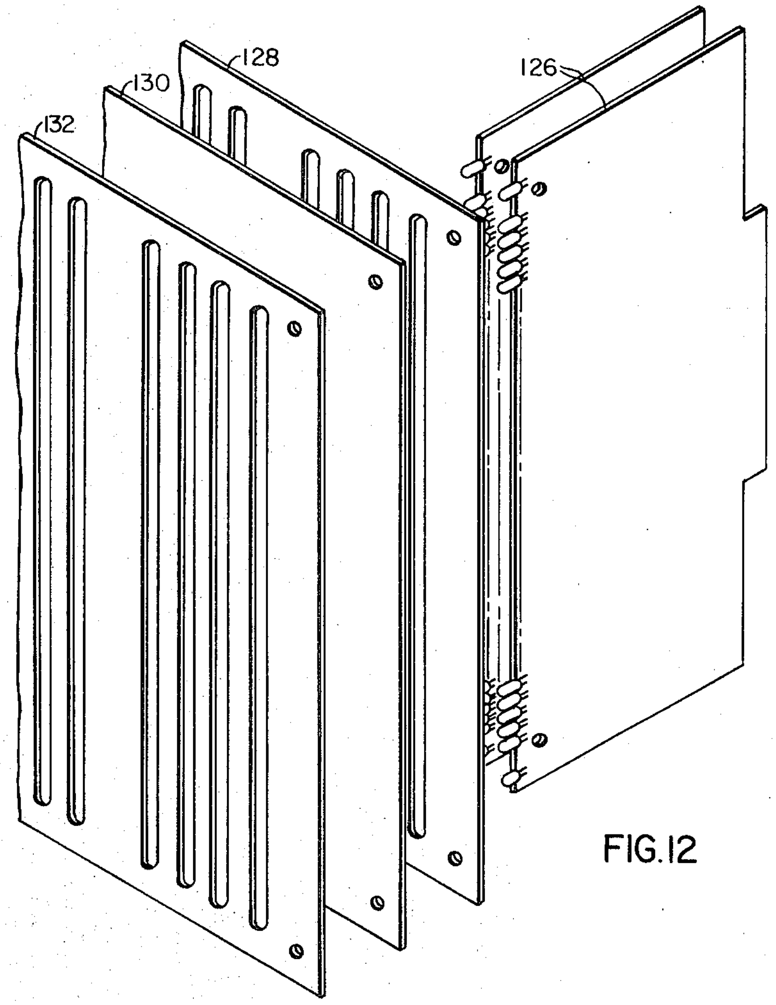
FIG. 12 is a pictorial illustration of the output display of the circuitry of FIGS. 11A and 11B.

There is one display unit required for each rod to be monitored by the rod position indication system. FIGS. 11A, 11B and 12 show a schematic of the display unit and its mounting in the control room electronics. The display unit performs two basic functions. First, it displays the position of each rod monitored including the local alarm on a per rod basis; and, second, it provides the GO signal to the central control unit which enables the entire system to be expanded in a simplified manner with a minimum of backwiring required.

Figure 17:
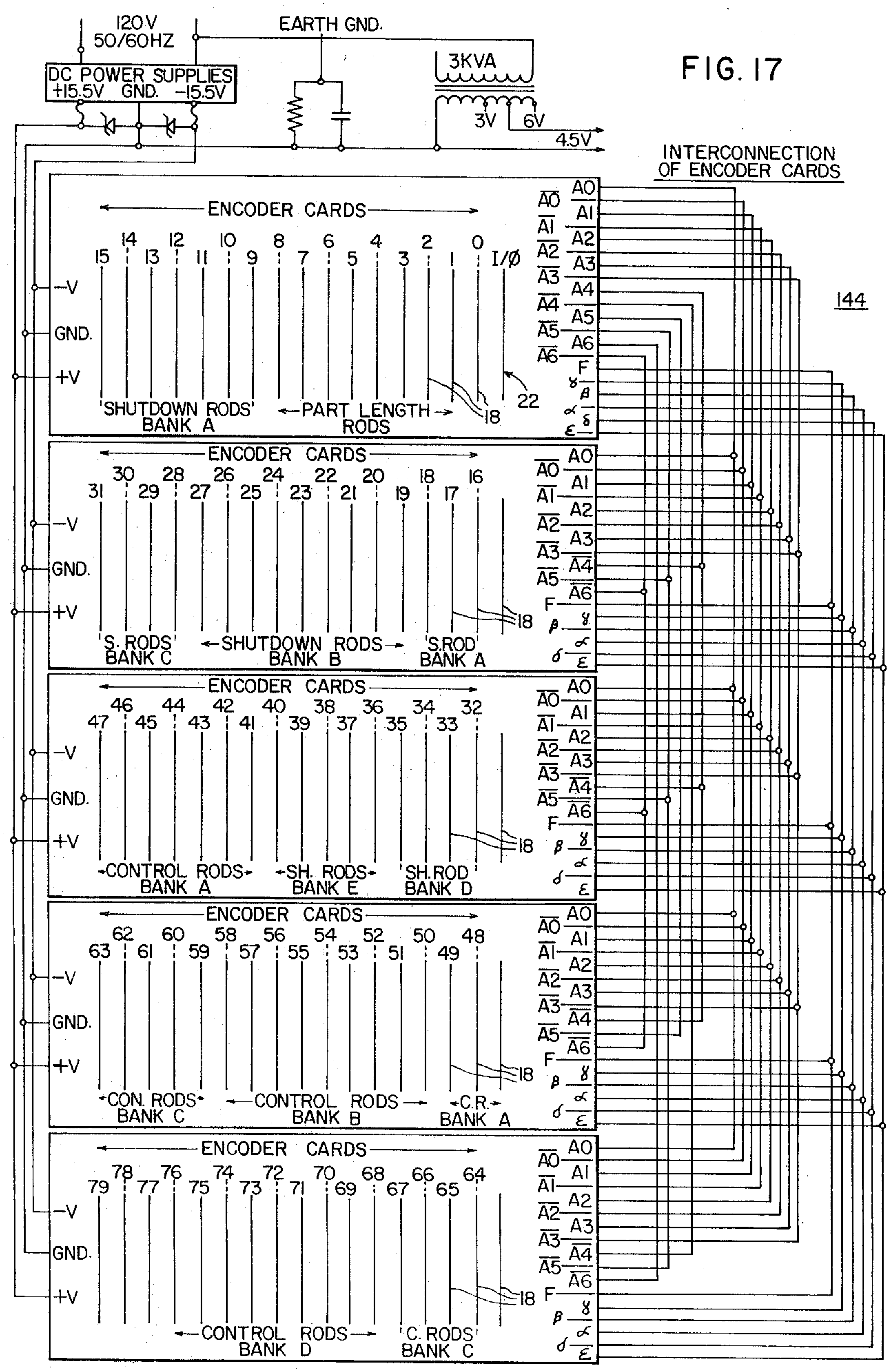
FIGS. 17, 18, 19 and 20 are schematic diagrammatic illustrations of the wiring between subsystems of the control room group of FIG. 2.

The first function performed by the display unit is implemented by all of the circuitry illustrated in FIG. 11A and 11B except for components 500, 502 and 504 identified generally by reference character 116 in FIG. 11A. The 6-bit binary code representing the rod position is distributed to inputs $D^0$ through $D^5$ of all display units as shown in FIG. 17A. In a like manner, the general warning signal G.W. is distributed to the G.W. input of all display units. The address and strobe inputs are connected to the address lines from the central control subunits such that each display unit is assigned a unique address A1′–A7′ as shown in FIG. 11A. Each unique address is established by the interconnection of the display units with the addresses. The diodes 506 and resistors 508 provide additional protection for the COS/MOS circuitry. The circuitry 118 in FIG. 11A performs the function of latches with filtered memory. The latches are strobed by the circuitry 120 when all of the addresses and strobe inputs are logical ones. The strobe input will be S2B. Therefore, since each display subunit is assigned a unique address, the latches will only be strobed during the second half of the address period assigned by the backwiring to this subunit and its associated rod. The general warning thus memorized is used to drive the general warning light-emitting diodes via NAND gate 510, resistor 512 and transistor 514 shown in FIG. 11B. The 6-bit binary code must, however, be decoded by the NAND and NOR gates 122 to drive the row and column matrix of light-emitting diodes 124. Transistors 516 through 540 provide additional current driving capability. At a given time, only one row and one column is selected so that no more than one light-emitting diode in the matrix is emitting light. Each light-emitting diode represents six steps of the rod jack mechanism in the control rod drive. The transition from one light-emitting (e.g., 6) to the next (e.g., 12) will occur at the center position of a coil (e.g., 9).

The second function performed by the display unit is that of providing the GO signal to the central control unit. This is accomplished by components 500, 502 and 504 generally represented by reference character 116 in FIG. 11A. When a display subunit is both addressed and strobed it also raises the common GO line to the central control unit verifying the existence of a display unit and therefore the necessity of doing rod bottom and alarm checks on the rod selected by this address. If the GO signal does not appear, then no display subunit exists because no rod is being monitored by that address. In this way, a simple standard backwiring package capable of handling the largest expected future system is generated. Application to a particular system is accomplished by insertion of only the required number of units, two encoder and one display subunit per rod. Since the backwiring is standard and simple it can be implemented by more economical means than manual point-to-point wiring. These include automatic point-to-point wiring, bus wiring, and printed circuit board techniques.

To make an acceptable display several techniques similar to the one illustrated in FIG. 12 are available. Here, the display subunits 126 are mounted in a card cage 128 in a conventional manner. Over the front of the cage is placed a light filter 130 to provide a low ambient light level in the card cage and therefore a better contrast ratio from light off to light on. Because of the flexibility of such a filter, a rigid support panel 132 should be placed in front of or possibly in back of the filter. This panel could be metal with slots stamped out, as shown, or whole areas stamped out for backs of control rods. Another alternative is to use clear plexiglass or picture glass for the support plate. Here, the glare from reflected light can be minimized by chemical treatment of the surface or use of a very lightly matted surface. Lettering can be screened on either the front or back of the clear support panel or on the front of the filter.

Accordingly, the display unit displays the position of each rod monitored including thelocal alarm on a per rod basis and provides an additional signal to the central control unit which enables a simplified expansion scheme of the system to be employed.

Computer Input/Output Interface

The function of the computer input/output interface is to adapt the rod position information to a form suitable for most computers. Obviously, the resulting unit must be compatible with existing hardware generally available in most process computers. Contact closure input and output hardware is generally available on most process computers and the present illustration of an exemplary embodiment of this invention is designed to be compatible therewith. Although the resulting interface might be considered relatively slow, it is quite adequate for the purposes required by this system and it best ensures compatibility with the various machines. A further requirement of this invention is that it not be slaved to the computer and operate under certain failure conditions, and yet it is necessary to synchronize the transmission of information to the computer in a simple efficient manner. A large memory is provided on the computer input/output interface for this purpose and is designed to store all the available rod position information. The memory is periodically updated with information provided from the two 5-bit gray codes and the two parity bits. The computer can then process the data in a manner similar to that of the central control unit to reach a separate opinion concering rod position, independent of the light-emitting diode display. In addition, an interrupt is generated by the computer input/output interface each time any data in an address cycle changes states. In this way, the computer need only read when necessary.

Figure 13:
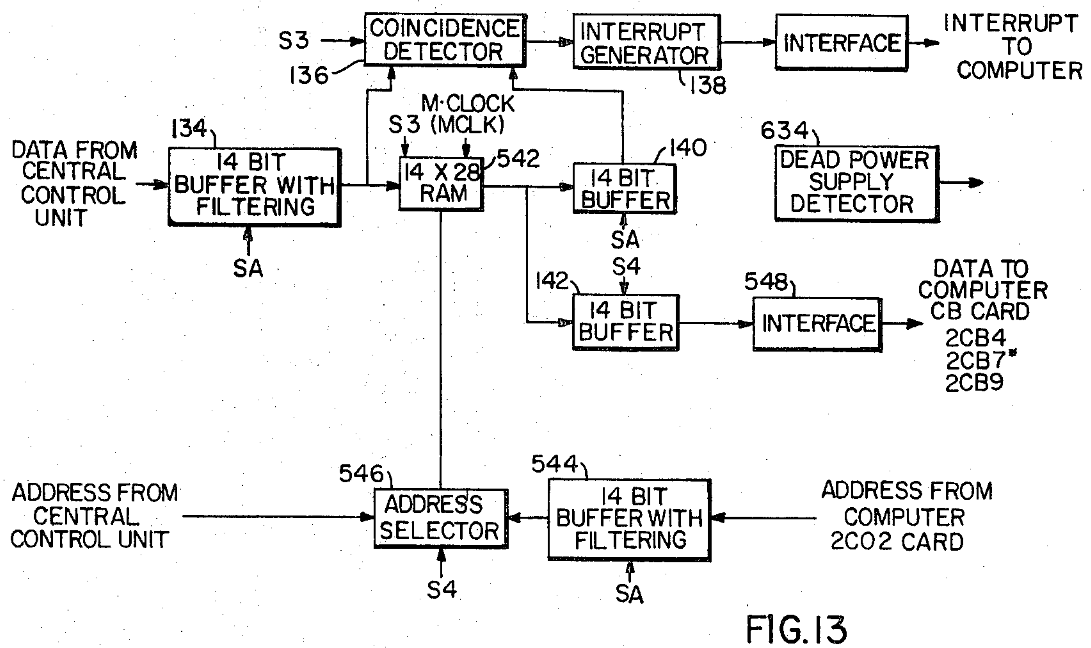
FIG. 13 is a block diagram of the computer interface of FIG. 2.
Figure 14:
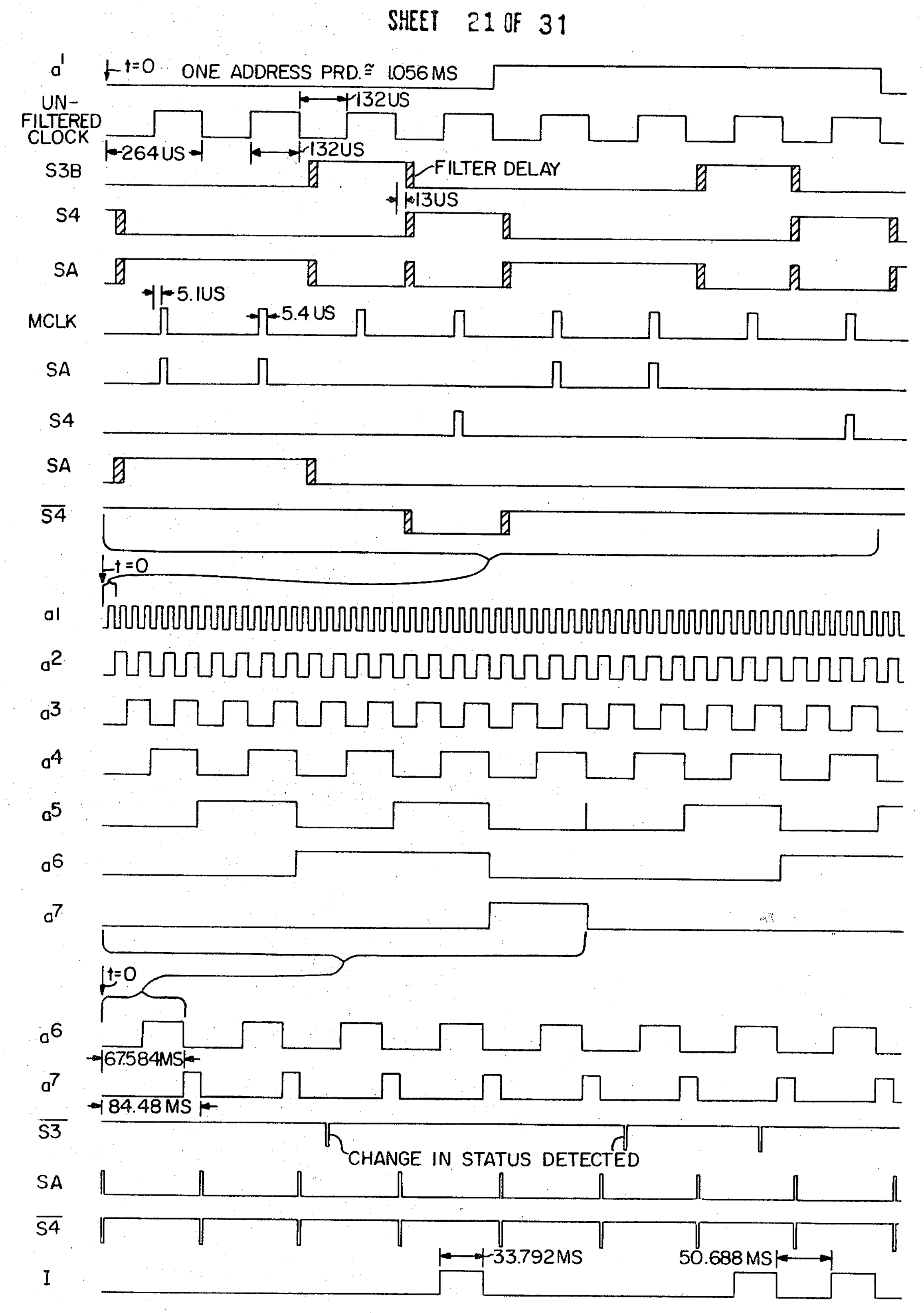
FIG. 14 is a graphical illustration of the timing of events for the computer interface of FIG. 13.

A block diagram of the computer input/output interface is shown in FIG. 13 and a corresponding timing diagram is provided in FIG. 14. Each address period is broken into three parts by the strobes, SA, S3B and S4. During the first three-fourths of each address period (controlled by SA and S3) the central control unit controls the computer input/output interface in order to determine change of status and to update information in the memory. During the last one-fourth of each address (controlled by S4) control of the memory is turned over to the contact closure inputs of the computer to allow the computer to read the position of any rod from the memory. Rod selection is determined by the address selector 546 illustrated in FIG. 13.

During the first one-half of each address period, controlled by SA, new data for the selected rod from the central control unit is stored in a 14-bit buffer 134; the old data for that rod is read from the 14 × 128 random access memory (RAM) 542 and stored in a 14-bit buffer 140; and the address presented to the system by the computer contact closure outputs is stored in a 14-bit buffer 544, as illustrated in the block diagram shown in FIG. 13. During the third one-fourth of each address period, controlled by S3, the new data for the selected rod position is written into the 14 × 128 RAM 542 and compared with the old corresponding data previously stored in the 14-bit buffer 140 by coincidence detector 136 during SA. If there has been a change in status an interrupt will be raised to the computer during the next address cycle by the interrupt generator 138. During the fourth one-fourth of each address period, the address selector 546 turns control of the 14 × 128 RAM 542 over to the address from the computer stored in the 14-bit buffer 544 during SA. At this time, data corresponding to that address is read from the 14 × 128 RAM 542 and stored in a 14-bit buffer 142. The outputs of this buffer 142 via interface circuitry 548 are transmitted to the computer. This process is repeated every address period. Therefore, a maximum of 2 milliseconds delay exists between the time address contact closure inputs are presented and the corresponding data to the computer is steady. The P–250 computer (manufactured by the Westinghouse Electric Corp., Pittsburgh, Pa.) input/output card types compatible with this interface are shown in FIG. 13 as an example.

Figure 15A:
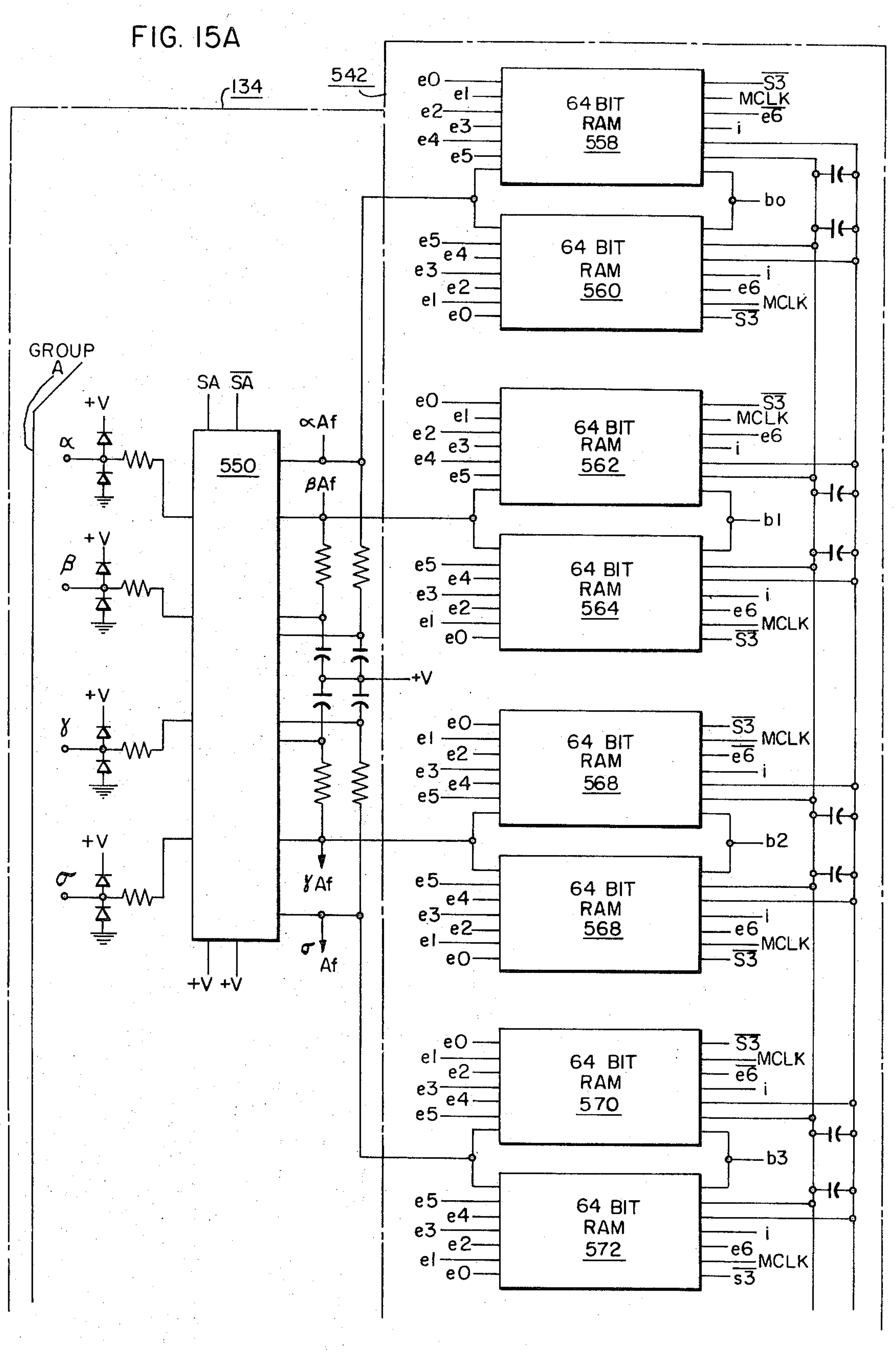
FIGS. 15A, 15B, 15C, and 15D are schematic circuitry diagrams of a portion of the computer interface of FIG. 13.
Figure 15B:
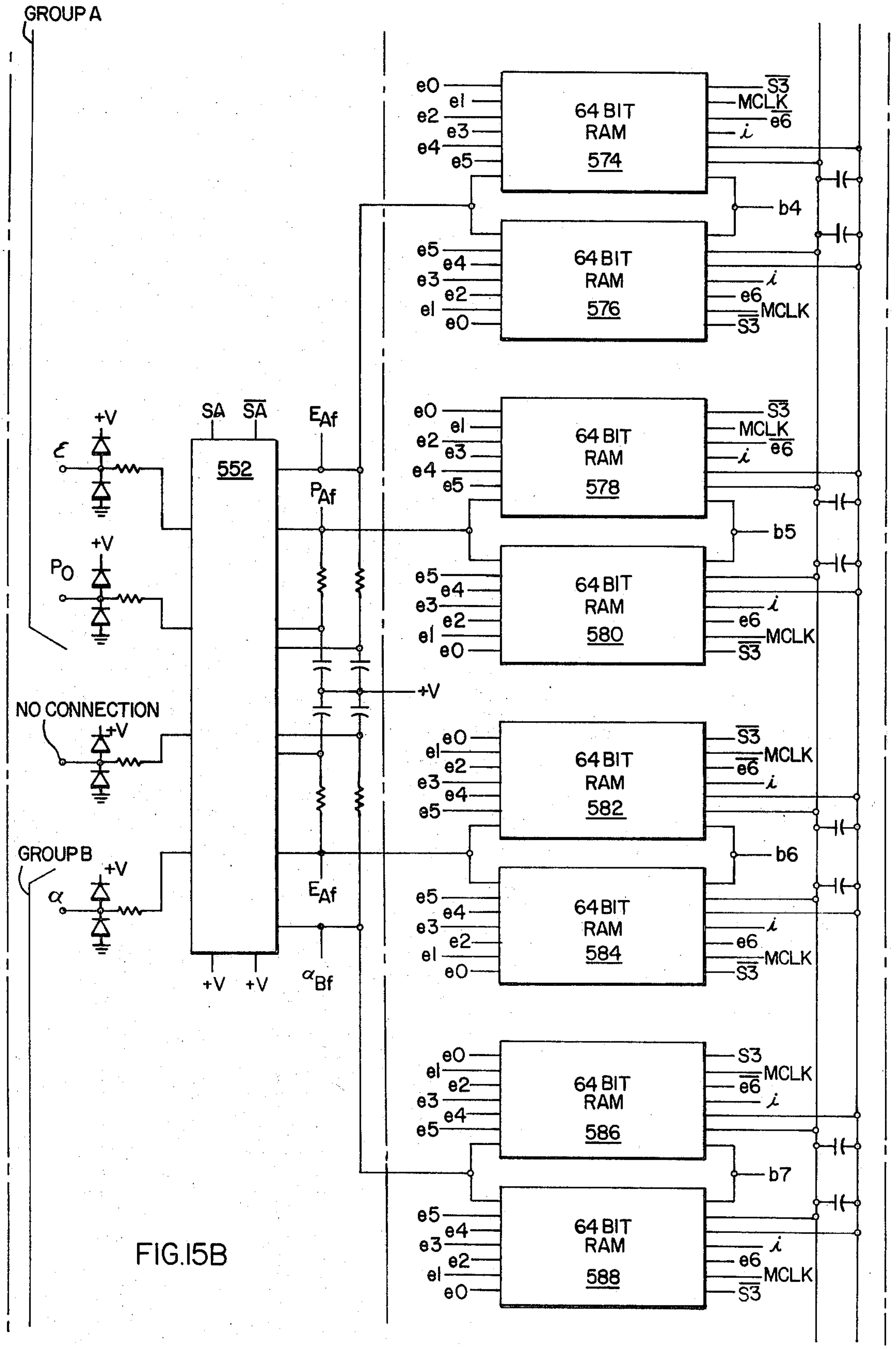
Figure 15C:
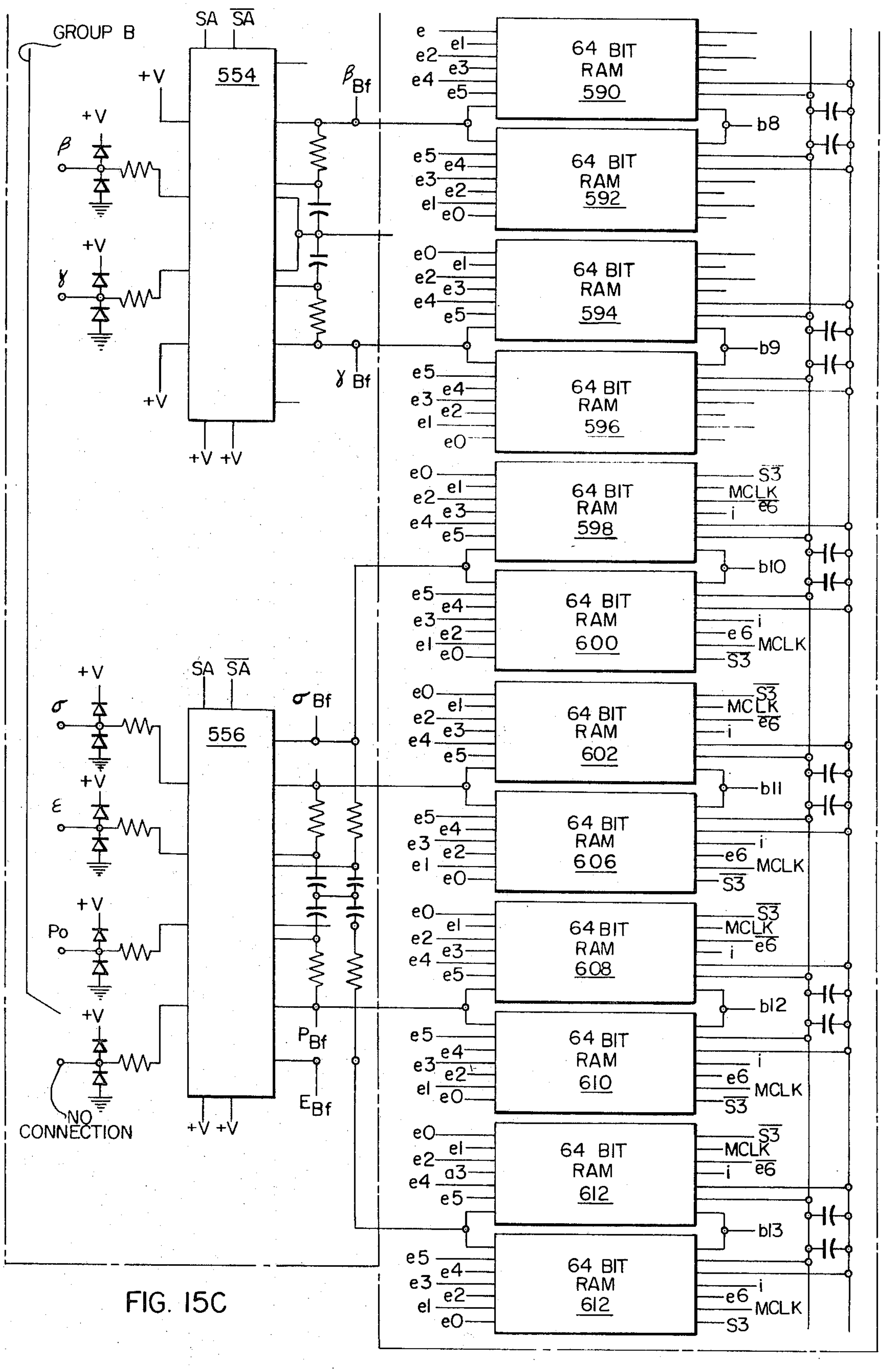
Figure 15D:
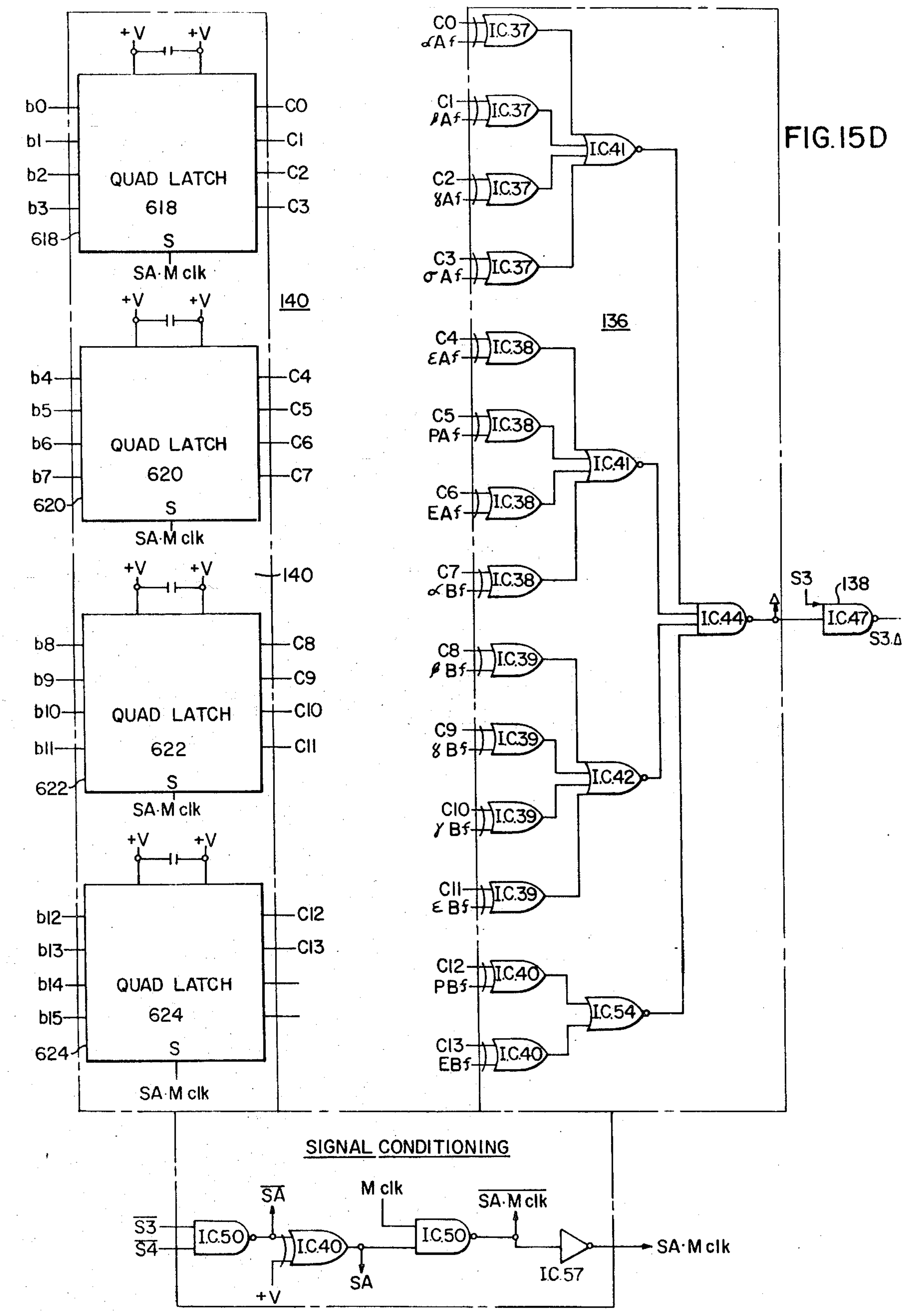
Figure 16A:
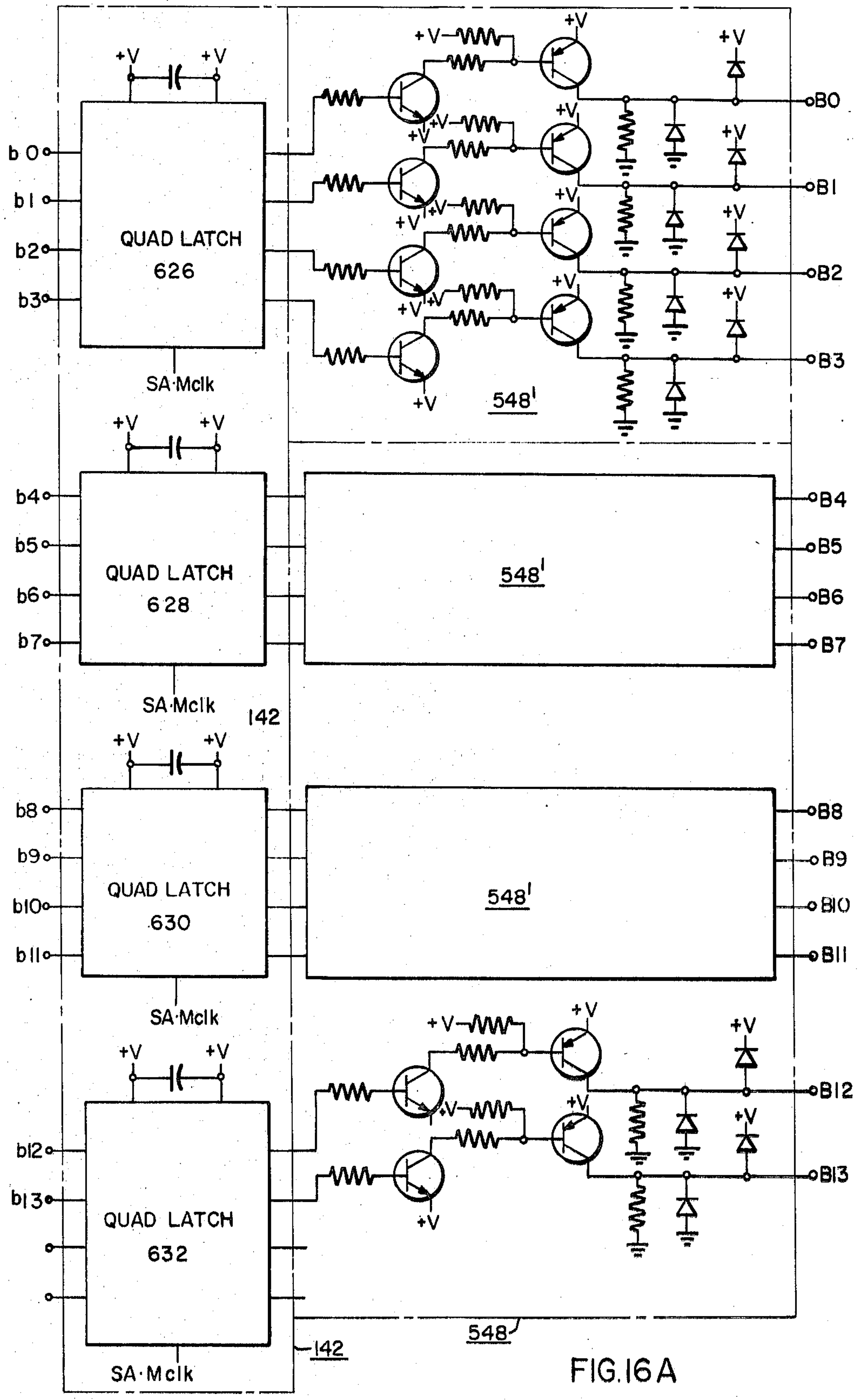
FIGS. 16A and 16B are second schematic circuitry diagrams of a second portion of the computer interface of FIG. 13.
Figure 16B:
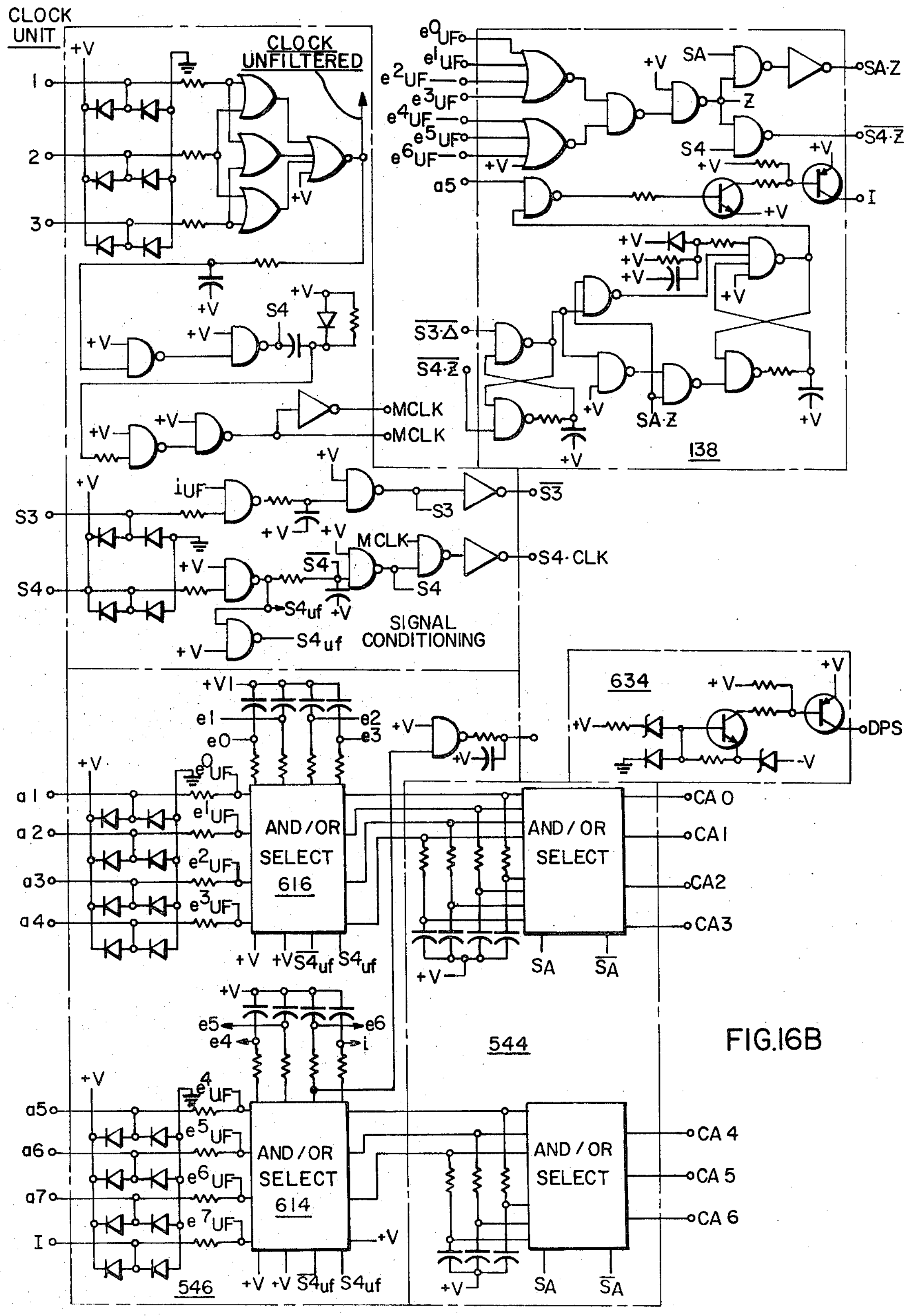

A schematic of the computer input/output interface is illustrated in FIGS. 15A, 15B, 15C, 15D, 16A and 16B. A comparison of the block diagram appearing in FIG. 13 to the schematic reveals that the 14-bit buffer with filtering 134 in FIG. 13 is implemented by the AND/OR selects 550 through 556 and associated hardware in FIGS. 15A, 15B, and 15C. The coincidence detector 136 in FIG. 13 is accomplished by the circuitry identified by reference 136 in FIG. 15D. The 14 × 128 RAM 542 is composed of the individual 64-bit RAMS 558 through 612 illustrated in FIGS. 15A, 15B and 15C. The address selector 546 shown in FIG. 13 comprises the AND/OR selects 614 and 616 in FIG. 16B while the filters are represented by the associated resistors and capacitors. The interrupt generator 138 of FIG. 13 is shown in FIG. 15D by reference character 138. The 14-bit buffer 140 of FIG. 13 is composed of quad latches 618 through 624 illustrated by reference character 140 in FIG. 15D; and the 14-bit buffer 142 of FIG. 13 is composed of quad latches 626 through 632 shown in FIG. 16A by reference character 142, etc. A cross reference to the description provided for the block diagram in FIG. 13 will enable one skilled in the art to easily implement the circuits described to provide the specified functions for the input/output computer interface. The interconnection of signals is as indicated by like reference characters. The various FIGS. 15A, 15B, 15C, 15D and 16A, 16B should be considered as continuations of each other to better understand the connection of like reference characters.

Interconnection of Subunits to Form Position Indication System

The exemplary design provided as illustrative of this invention with subcircuit layouts have been planned to provide a simplified interconnection of the subunits described comprising the system of this invention. The result can be expanded to a simple standard backwiring pattern which can be employed on all rod position indication systems incorporating this invention. The resulting backwiring could be implemented using automated point-to-point wiring, bus wiring techniques including bus wrap, or by printed circuit boards. Customization for a particular application is accomplished by supplying only the necessary number of subunits required to monitor the movable members whose position is desired (control rods in this exemplary embodiment).

The containment and control room electronics backwiring is shown in FIGS. 17, 18 19 and 20. FIGS. 17, 18 19 and 20 show the interconnection of the input/output interface and control subunits with the display subunits. Again, this approach provides a standard backwiring pattern to be used for all systems in which customization is accomplished by providing only those display cards corresponding to rods that actually exist.

While the interconnection of elements and the discussion of their individual operation has been directed to an application in detecting the position of control rods within a nuclear reactor, it should be understood that this invention is applicable to a broad area of position indicating devices, especially in those areas employed for monitoring elongated movable members having one degree of freedom. In those areas the analogy to control rod position indication is directly applicable.

Data Processing by the Plant Computer

While the plant computer is not directly a part of this invention, the computer input/output interface enables this invention to be employed almost universally with any digital computer. The plant computer receives the position of each rod through the input/output interface to perform data logging, rod deviation and other comparisons. In an effort to minimize the amount of equipment between the computer and the detector, the data fed to the computer is provided in raw gray code form just as received from the containment and therefore will require a small degree of processing to obtain true rod position.

As the position indication system cycles through its multiplexing sequence, it checks the information in each address against that previously obtained in the last cycle. If the information has changed, the position indication system will raise an interrupt to the computer during the next address cycle. The computer will scan this interrupt once each 8 seconds. If an interrupt has occurred the computer will enter the status of all existing rods. This is done by presenting the address of the rod desired using contact closure outputs and, after a 9 millisecond hardware delay, reading the resulting information presented by the position indication system. As each piece of data is read a new address can be set up. Each piece of data must be processed to determine the true rod position before being stored for later use. Each 5-bit gray code and parity bit must be checked for parity errors and error codes. Even parity is employed and the error codes are shown in FIG. 4. The gray codes are then converted to binary as shown in FIG. 3. If no errors were found, the true rod position in steps is obtained by adding the two 5-bit binary codes and multiplying by 6. If an error were found in one gray code, the true rod position would be obtained by adding the remaining good binary code to itself, multiplying the 6, and adding or subtracting 3 (add 3 if the error was found in the A train data and subtract 3 if the error was found in the B train data). If an error was found in both gray codes or the binary codes differed in magnitude by more than one, the resulting true rod position should be forced to the rod bottom state (00000). The resulting true rod position can be searched for rod bottom information when desired by using the criteria that the rod is less than four steps. A rod bottom contact closure output is available from the position indication system if desired. The true position can then be stored, with a code attached indicating the type of errors found. Eventual rod deviation comparisons can be made using the following criteria: (1) if all rods under comparison are at full accuracy (no errors), a rod deviation alarm should be sounded only if a deviation of nine steps or more is found; (2) if any rod under comparison is at half accuracy (an error was found in either the A train or B train gray code) then an alarm should be sounded if that rod deviated from any other by 13 or more steps; and (3) if the position of any rod under comparison is unknown (an error was found in both the A train and B train gray codes or the binary codes differed by more than one) then any comparison involving that rod should sound an alarm.

Accordingly, a program for accomplishing this procedure can be compiled by those skilled in the computer art utilizing the inputs provided by the computer input/output interface of this invention.

Thus, the new position indication system described and contemplated by this invention offers many improvements over existing systems. Unlike existing systems, it is inherently linear utilizing identical coils with the inherent characteristics of being insensitive to temperature changes, variations in magnetic properties, power supply variations, rod diameter of magnetization, etc. Additionally, the system possesses the capability of recovering from most malfunctions with only a slight loss of resolution on the affected member being detected. Expensive field wiring is reduced by the application of multiplexing; all rod bottom bistables previously employed are eliminated; computer input/output hardware is minimized; and since the system is digital, initial accuracy is maintained throughout with no need for calibration. Furthermore, the light-emitting diode matrix provides a clear, reliable, inexpensive display.

While the system has been described for nuclear reactor application, it can easily be recognized, that it can be expanded to cover a large variety of position indication and signal transmission needs with the attendant advantages cited.

We claim as our invention:

1. A digital position indication system for displaying the relative position of a movable element with respect to fixed known coordinates comprising:

sensory means responsive to the element's position to provide discrete electric outputs indicative thereof at corresponding output terminals;

an encoder electrically connected to said sensory means an operable upon said discrete outputs to provide a digital coded output represenative of the element's position;

signal transfer means electrically coupled to said encoder output and controlled by a corresponding command address signal to transmit said digital coded output;

signal retrieval means for generating, sequencing and transmitting said corresponding command address signal to said signal transfer means to effect transmission of said digital coded output to said retrieval means, said retrieval means being operable to process said digital coded encoder output into a display signal output;

fault detection means for monitoring said digital coded encoder output representative of the element's position for a malfunction and responsive to electrical malfunctions effecting said digital coded encoder output representative of the element's position to generate a separate digital coded encoder output identifying the malfunction and transmit the same to said signal retrieval means in place of the digital coded output associated with the malfunction in response to said address corresponding to said digital coded encoder output associated with the malfunction; and display means responsive to said display signal from said retrieval means to provide a corresponding visual display.

2. The digital position indication system of claim 1 wherein said sensory means includes an indicator array for detecting the location of an elongated, longitudinally movable, metallic element having one degree of freedom along an axis corresponding to its longitudinal dimension comprising:

a plurality of discrete electrical coils wound around the circumferential periphery of the axis of movement of the movable element and arranged longitudinally therealong;

an alternating current source electrically coupled to each of said plurality of coils; and detection means for respectively detecting a change in impedance within each of said plurality of coils as the movable element moves along its axis of movement, said detection means providing a set of said discrete outputs indicative of the position of the movable element relative to said arrangement of discrete coils.

3. The digital position indication system of claim 2 wherein the movable element has an elongated dimension approximately equal to the longitudinal dimension of said arrangement of discrete coils and the movable element appears susbstantially within the center of each of said plurality of discrete coils, concurrently, at at least one point in travel thereof.

4. The digital position indication system of claim 2 wherein said detection means includes means for comparing the impedance within adjacent coils along said arrangement of coils and said set of discrete outputs corresponds approximately to a coordinate between two of said plurality of coils exhibiting the largest difference of impedance within said arrangement of coils.

5. The digital position indication system of claim 2 wherein siad sensory means includes a second indicator array comprising:

a second arrangement of a plurality of discrete coils wound around the circumferential periphery of the axis of movement of the movable element and arranged longitudinally therealong interleaved between said plurality of discrete coils on a corresponding alternate coil basis so that corresponding ones of said plurality of discrete coils and said second arrangement lie adjacent;

an alternating current source electrically coupled to each of said plurality of coils within said second arrangement; and second detection means for respectively detecting a change in impedance within each of said plurality of coils within said second arrangement as the movable element moves along its axis of movement, said second detection means providing a second set of said discrete outputs indicative of the position of the movable element relative to said second arrangement of discrete coils.

6. The digital position indication system of claim 5 wherein said encoder includes a plurality of encoder circuits respectively corresponding to the number of said indicator arrays, said encoder circuits being electrically isolated from and operating independently of each other and individually operable upon respective associative sets of said discrete outputs from said corresponding arrays to provide corresponding digital outputs.

7. The digital position indication system of claim 6 wherein said signal transfer means includes a plurality of individual signal transfer circuits respectively corresponding to the number of said encoder circuits, said transfer circuits being electrically isolated from and operated independently of each other and individually operable upon said corresponding digital coded encoder output to transmit the same to said retrieval means upon said corresponding command address signal.

8. The position indication system of claim 7 wherein corresponding digital outputs transmitted by said transfer circuits are compared in said control means and a one bit difference is indicated as a malfunction within the indication system.

9. The position indication system of claim 6 wherein said signal retrieval means combines said digital outputs representative of the elements position from said encoder circuits by algebraic addition of the respective codes to provide increased resolution of the information conveyed thereby.

10. The position indication system of claim 1 wherein said fault detection means provides an alarm signal indicative of the location of the malfunction within the position indication system.

11. The position indication system of claim 1 wherein said display means comprises a pictorial array of lights indicative of the movable element's position.

12. The position indication system of claim 1 for displaying the relative position of each of a plurality of movable elements with respect to fixed known coordinates:

a plurality of said sensory means, corresponding to said plurality of movable elements, respectively responsive to the corresponding element's position to provide discrete electrical outputs indicative thereof;

a plurality of said encoders, corresponding to said plurality of sensory means and individually operable upon said discrete outputs associated with said corresponding sensory means to provide digital coded outputs representative of the corresponding element's position;

said signal transfer means being operable upon said digital outputs to transmit a respective group thereof upon said corresponding address signal;

said signal retrieval means being operable to generate and transmit a second respective command address, corresponding to said group of said digital coded outputs addressed, to said display means along with said display signal; and said display means being operable to provide a visual display of the corresponding element's position according to said second address and said display signal.

13. The position indication system of claim 12 wherein said display means includes a plurality of display output units respectively corresponding to the number of said sensory means and said display means is responsive to said second address to electrically couple said display unit corresponding to said sensory means whose associated digital coded output is being addressed and transmit said display signal to said corresponding display unit.

14. The position indication system of claim 1 wherein the movable member is a nuclear reactor control rod drive shaft.

15. A multiplexed transmission system for transmitting a plurality of discrete independent signals comprising:

a plurality of encoders, respectively corresponding to the plurality of discrete signals, and individually operable to encode corresponding ones of said discrete signals into corresponding digital coded outputs representative thereof;

signal transfer means electrically coupled to said digital coded outputs and controlled by a corresponding command address signal to transmit a respective group of said digital coded outputs;

signal retrieval means for generating, sequencing and transmitting said corresponding command address signal to said signal transfer means to effect transmission of said digital coded outputs to said retrieval means, said retrieval means being operable to process said digital coded outputs into a corresponding decoded information output signal and generate a second unique command address corresponding thereto;

fault detection means for monitoring said digital coded encoder outputs representative of said discrete signals for a malfunction and responsive to electrical malfunctions effecting said digital coded encoder outputs representative of said discrete signals to generate a separate digital coded output identifying the malfunction and transmit the same in place of the digital coded encoder output associated with the malfunction to said retrieval means in response to said address corresponding to said digital coded encoder output associated with the malfunction; and output means electrically connected to said retrieval means and responsive to said second command address signal to process said decoded information signal into a predetermined format.

16. The transmission system of claim 15 wherein said fault detection means provides an alarm signal indicative of the location of the malfunction within the transmission system.

17. The transmission system of claim 15 wherein said predetermined format generated by said output means identifies the individual discrete signal corresponding to said decoded information output signal.

18. The transmission system of claim 17 wherein said output means includes a plurality of output circuits, corresponding to said plurality of discrete independent signals and is responsive to said second command address to electrically couple the respective output circuit corresponding to the discrete independent signal being addressed and transmit said decoded information signal to the respective output circuit corresponding thereto which processes said information signal into said predetermined format.

* * * * *